(12) United States Patent
Hsu-Hoffman et al.

(10) Patent No.: US 12,361,494 B2
(45) Date of Patent: *Jul. 15, 2025

(54) SUBJECTIVE ROUTE RISK MAPPING AND MITIGATION

(71) Applicant: Allstate Insurance Company, Northbrook, IL (US)

(72) Inventors: Chienlan Hsu-Hoffman, Palo Alto, CA (US); Regina Madigan, Mountain View, CA (US); Thomas McKenna, San Francisco, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,802

(22) Filed: Dec. 21, 2020

(65) Prior Publication Data

US 2021/0110482 A1     Apr. 15, 2021

Related U.S. Application Data

(63) Continuation of application No. 16/294,103, filed on Mar. 6, 2019, now Pat. No. 10,885,592, which is a
(Continued)

(51) Int. Cl.
*G06Q 40/08* (2012.01)
*G01C 21/34* (2006.01)

(52) U.S. Cl.
CPC ......... *G06Q 40/08* (2013.01); *G01C 21/3461* (2013.01)

(58) Field of Classification Search
None
See application file for complete search history.

(56) References Cited

U.S. PATENT DOCUMENTS

| 83,960 A | 11/1868 | Heator |
| 4,119,166 A | 10/1978 | Ayotte et al. |

(Continued)

FOREIGN PATENT DOCUMENTS

| CN | 101131588 A | 2/2008 |
| DE | 102010001006 A1 | 7/2011 |

(Continued)

OTHER PUBLICATIONS

J. A. Healey and R. W. Picard, "Detecting stress during real-world driving tasks using physiological sensors," in IEEE Transactions on Intelligent Transportation Systems, vol. 6, No. 2, pp. 156-166, Jun. 2005. (Year: 2005).*

(Continued)

*Primary Examiner* — Mohammad Z Shaikh

(57) ABSTRACT

A system for determining a subjective risk score may include a vehicle and/or a computing device associated with a user travelling within the vehicle. The computing device may receive input from the user when the user feels a sense of unease regarding a particular road segment upon which the vehicle is traveling. The system may further include a subjective risk analysis computing system that may be communicatively coupled to the computing device. The subjective risk analysis computing system may receive subjective risk information corresponding to the user's sense of unease regarding particular road segments and may process the subjective risk information to determine a subjective risk score for each of a plurality of road segments along a route. An insurance company may use this information to determine whether to adjust a quote or premium of an insurance policy.

17 Claims, 6 Drawing Sheets

Related U.S. Application Data continuation of application No. 15/013,523, filed on Feb. 2, 2016, now Pat. No. 10,269,075.

(56) References Cited

U.S. PATENT DOCUMENTS

| | | | |
|---|---|---|---|
| 4,622,636 A | 11/1986 | Tachibana | |
| 4,706,072 A | 11/1987 | Keyama | |
| 4,926,336 A | 5/1990 | Yamada | |
| 5,053,964 A | 10/1991 | Mister et al. | |
| 5,270,708 A | 12/1993 | Kamishima | |
| 5,295,551 A | 3/1994 | Sukonick | |
| 5,430,432 A | 7/1995 | Camhi et al. | |
| 5,465,079 A | 11/1995 | Bouchard et al. | |
| 5,475,387 A | 12/1995 | Matsumoto | |
| 5,572,449 A | 11/1996 | Tang et al. | |
| 5,680,122 A | 10/1997 | Mio | |
| 5,710,565 A | 1/1998 | Shirai et al. | |
| 5,797,134 A | 8/1998 | McMillan et al. | |
| 5,848,373 A | 12/1998 | Delorme et al. | |
| 6,026,345 A | 2/2000 | Shah et al. | |
| 6,060,989 A | 5/2000 | Gehlot | |
| 6,064,970 A | 5/2000 | McMillan et al. | |
| 6,116,369 A | 9/2000 | King et al. | |
| 6,128,559 A | 10/2000 | Saitou et al. | |
| 6,186,793 B1 | 2/2001 | Brubaker | |
| 6,188,950 B1 | 2/2001 | Tsutsumi et al. | |
| 6,265,978 B1 | 7/2001 | Atlas | |
| 6,301,530 B1 | 10/2001 | Tamura | |
| 6,366,207 B1 | 4/2002 | Murphy | |
| 6,389,351 B1 | 5/2002 | Egawa et al. | |
| 6,415,226 B1 | 7/2002 | Kozak | |
| 6,502,020 B2 | 12/2002 | Lang | |
| 6,502,035 B2 | 12/2002 | Levine | |
| 6,599,243 B2* | 7/2003 | Woltermann | G08B 21/06 600/490 |
| 6,647,328 B2 | 11/2003 | Walker | |
| 6,675,094 B2 | 1/2004 | Russell et al. | |
| 6,707,378 B2 | 3/2004 | MacNeille et al. | |
| 6,732,024 B2 | 5/2004 | Wilhelm Rekow et al. | |
| 6,780,077 B2 | 8/2004 | Baumgartner et al. | |
| 6,868,386 B1 | 3/2005 | Henderson et al. | |
| 6,931,309 B2 | 8/2005 | Phelan et al. | |
| 6,982,635 B2 | 1/2006 | Obradovich | |
| 7,054,831 B2 | 5/2006 | Koenig | |
| 7,116,248 B2 | 10/2006 | Lu et al. | |
| 7,126,583 B1* | 10/2006 | Breed | B60K 37/06 345/173 |
| 7,133,771 B1 | 11/2006 | Nesbitt | |
| 7,186,199 B1 | 3/2007 | Baxter, Jr. | |
| 7,242,112 B2 | 7/2007 | Wolf et al. | |
| 7,286,825 B2 | 10/2007 | Shishido et al. | |
| 7,304,589 B2 | 12/2007 | Kagawa | |
| 7,315,239 B2 | 1/2008 | Cheng et al. | |
| 7,339,483 B1 | 3/2008 | Farmer | |
| 7,353,111 B2 | 4/2008 | Takahashi et al. | |
| 7,356,516 B2 | 4/2008 | Richey et al. | |
| 7,366,892 B2 | 4/2008 | Spaur et al. | |
| 7,389,198 B1 | 6/2008 | Dimitriadis | |
| 7,546,206 B1 | 6/2009 | Miller et al. | |
| 7,610,210 B2 | 10/2009 | Helitzer et al. | |
| 7,650,211 B2 | 1/2010 | Wang et al. | |
| 7,657,370 B2 | 2/2010 | Nagase et al. | |
| 7,657,441 B2 | 2/2010 | Richey et al. | |
| 7,660,725 B2 | 2/2010 | Wahlbin et al. | |
| 7,664,589 B2 | 2/2010 | Etori et al. | |
| 7,739,087 B2 | 6/2010 | Qiu | |
| 7,805,321 B2 | 9/2010 | Wahlbin et al. | |
| 7,818,187 B2 | 10/2010 | Wahlbin et al. | |
| 7,821,421 B2 | 10/2010 | Tamir et al. | |
| 7,822,384 B2 | 10/2010 | Anschutz et al. | |
| 7,937,278 B1 | 5/2011 | Cripe et al. | |
| 7,966,118 B2 | 6/2011 | Kade | |
| 7,991,629 B2 | 8/2011 | Gay et al. | |
| 8,031,062 B2 | 10/2011 | Smith | |
| 8,065,169 B1 | 11/2011 | Oldham et al. | |
| 8,078,349 B1 | 12/2011 | Prada Gomez et al. | |
| 8,078,382 B2 | 12/2011 | Sugano et al. | |
| 8,086,523 B1 | 12/2011 | Palmer | |
| 8,090,598 B2 | 1/2012 | Bauer et al. | |
| 8,108,083 B2* | 1/2012 | Kameyama | G16H 50/30 701/538 |
| 8,139,109 B2 | 3/2012 | Schmiedel et al. | |
| 8,145,393 B2 | 3/2012 | Foster et al. | |
| 8,152,589 B2 | 4/2012 | Bowen et al. | |
| 8,160,809 B2 | 4/2012 | Farwell et al. | |
| 8,180,655 B1 | 5/2012 | Hopkins, III | |
| 8,195,394 B1 | 6/2012 | Zhu et al. | |
| 8,204,666 B2* | 6/2012 | Takeuchi | B60K 28/06 701/70 |
| 8,229,618 B2 | 7/2012 | Tolstedt et al. | |
| 8,280,308 B2 | 10/2012 | Anschutz et al. | |
| 8,280,752 B1 | 10/2012 | Cripe et al. | |
| 8,290,701 B2 | 10/2012 | Mason et al. | |
| 8,314,718 B2 | 11/2012 | Muthaiah et al. | |
| 8,326,473 B2 | 12/2012 | Simpson et al. | |
| 8,335,607 B2 | 12/2012 | Gatten et al. | |
| 8,352,112 B2 | 1/2013 | Mudalige | |
| 8,352,179 B2* | 1/2013 | French | G01C 21/3415 701/425 |
| 8,407,139 B1 | 3/2013 | Palmer | |
| 8,457,827 B1 | 6/2013 | Ferguson et al. | |
| 8,457,892 B2 | 6/2013 | Aso et al. | |
| 8,538,785 B2 | 9/2013 | Coleman et al. | |
| 8,549,318 B2 | 10/2013 | White et al. | |
| 8,554,468 B1 | 10/2013 | Bullock | |
| 8,566,126 B1 | 10/2013 | Hopkins, III | |
| 8,577,703 B2 | 11/2013 | McClellan et al. | |
| 8,595,037 B1 | 11/2013 | Hyde et al. | |
| 8,606,512 B1* | 12/2013 | Bogovich | H04W 4/40 701/410 |
| 8,620,575 B2* | 12/2013 | Vogt | G08G 1/096838 701/410 |
| 8,620,693 B1 | 12/2013 | Schumann, Jr. | |
| 8,634,395 B2* | 1/2014 | Seok | H04W 24/10 370/392 |
| 8,639,535 B1 | 1/2014 | Kazenas | |
| 8,659,436 B2* | 2/2014 | Ngo | G08B 21/06 340/576 |
| 8,676,466 B2 | 3/2014 | Mudalige | |
| 8,686,844 B1 | 4/2014 | Wine | |
| 8,718,861 B1 | 5/2014 | Montemerlo et al. | |
| 8,725,311 B1 | 5/2014 | Breed | |
| 8,750,306 B2 | 6/2014 | Yousefi et al. | |
| 8,757,309 B2 | 6/2014 | Schmitt et al. | |
| 8,781,669 B1 | 7/2014 | Teller et al. | |
| 8,798,841 B1 | 8/2014 | Nickolaou et al. | |
| 8,799,036 B1 | 8/2014 | Christensen et al. | |
| 8,812,330 B1 | 8/2014 | Cripe et al. | |
| 8,818,725 B2 | 8/2014 | Ricci | |
| 8,854,199 B2* | 10/2014 | Cook | G07C 5/00 701/1 |
| 8,930,269 B2 | 1/2015 | He et al. | |
| 8,949,016 B1 | 2/2015 | Ferguson et al. | |
| 8,954,226 B1 | 2/2015 | Binion et al. | |
| 8,996,303 B1 | 3/2015 | Bogovich et al. | |
| 9,020,751 B1* | 4/2015 | Bogovich | H04W 4/024 701/410 |
| 9,046,374 B2 | 6/2015 | Ricci | |
| 9,063,543 B2 | 6/2015 | An et al. | |
| 9,079,587 B1 | 7/2015 | Rupp et al. | |
| 9,141,582 B1 | 9/2015 | Brinkmann et al. | |
| 9,188,985 B1 | 11/2015 | Hobbs et al. | |
| 9,212,921 B1* | 12/2015 | Sisbot | G08G 1/096791 |
| 9,216,737 B1 | 12/2015 | Zhu et al. | |
| 9,262,787 B2 | 2/2016 | Binion et al. | |
| 9,291,474 B2* | 3/2016 | Basson | G01C 21/3697 |
| 9,297,663 B1* | 3/2016 | Golding | G01C 21/3484 |
| 9,330,571 B2 | 5/2016 | Ferguson et al. | |
| 9,338,607 B2 | 5/2016 | Takehara et al. | |
| 9,355,423 B1 | 5/2016 | Slusar | |
| 9,355,546 B2 | 5/2016 | Kim et al. | |
| 9,373,149 B2 | 6/2016 | Abhyanker | |
| 9,384,148 B2 | 7/2016 | Muttik et al. | |

(56) References Cited

U.S. PATENT DOCUMENTS

| | | | |
|---|---|---|---|
| 9,390,451 B1 | 7/2016 | Slusar | |
| 9,433,843 B2 | 9/2016 | Morlock | |
| 9,457,814 B2* | 10/2016 | Kim | B60W 40/06 |
| 9,495,874 B1 | 11/2016 | Zhu et al. | |
| 9,605,970 B1* | 3/2017 | Day | B60G 17/015 |
| 9,618,359 B2* | 4/2017 | Weast | G01C 21/3453 |
| 9,648,107 B1 | 5/2017 | Penilla et al. | |
| 9,679,487 B1 | 6/2017 | Hayward | |
| 9,691,298 B1* | 6/2017 | Hsu-Hoffman | G09B 19/167 |
| 9,715,711 B1 | 7/2017 | Konrardy et al. | |
| 9,733,097 B2* | 8/2017 | Sisbot | G01C 21/3461 |
| 9,739,627 B1 | 8/2017 | Chintakindi | |
| 9,758,039 B2 | 9/2017 | Hannon | |
| 9,765,516 B2 | 9/2017 | Van Dinther et al. | |
| 9,767,516 B1 | 9/2017 | Konrardy et al. | |
| 9,773,093 B2* | 9/2017 | Bernini | A61B 5/0024 |
| 9,792,656 B1 | 10/2017 | Konrardy et al. | |
| 9,801,580 B2* | 10/2017 | Iizuka | A61B 3/112 |
| 9,851,214 B1 | 12/2017 | Chintakindi | |
| 9,858,621 B1 | 1/2018 | Konrardy et al. | |
| 9,865,019 B2 | 1/2018 | Bogovich et al. | |
| 9,870,649 B1 | 1/2018 | Fields et al. | |
| 9,904,289 B1 | 2/2018 | Hayward | |
| 9,904,900 B2 | 2/2018 | Cao | |
| 9,919,712 B1* | 3/2018 | Doyen | A61B 5/14542 |
| 9,922,374 B1 | 3/2018 | Vose et al. | |
| 9,928,432 B1 | 3/2018 | Sathyanarayana et al. | |
| 9,931,062 B2 | 4/2018 | Cavallaro et al. | |
| 9,932,033 B2 | 4/2018 | Slusar et al. | |
| 9,940,834 B1 | 4/2018 | Konrardy et al. | |
| 9,946,334 B2* | 4/2018 | Pala | G06F 3/011 |
| 9,953,300 B2 | 4/2018 | Connor | |
| 9,972,054 B1 | 5/2018 | Konrardy et al. | |
| 10,012,510 B2 | 7/2018 | Denaro | |
| 10,037,578 B2 | 7/2018 | Bogovich et al. | |
| 10,037,580 B2 | 7/2018 | Bogovich et al. | |
| 10,046,618 B2* | 8/2018 | Kirsch | B60W 40/08 |
| 10,078,871 B2 | 9/2018 | Sanchez et al. | |
| 10,089,694 B1* | 10/2018 | Biemer | G06Q 40/08 |
| 10,096,038 B2* | 10/2018 | Ramirez | G06Q 50/40 |
| 10,127,737 B1* | 11/2018 | Manzella | A61B 5/02055 |
| 10,157,422 B2* | 12/2018 | Jordan Peters | G06Q 30/0207 |
| 10,269,075 B2* | 4/2019 | Hsu-Hoffman | G06Q 40/08 |
| 10,657,597 B1 | 5/2020 | Billman et al. | |
| 10,885,592 B2* | 1/2021 | Hsu-Hoffman | G06Q 40/08 |
| 11,017,495 B2* | 5/2021 | Wong | G09G 5/363 |
| 2001/0020902 A1 | 9/2001 | Tamura | |
| 2001/0020903 A1 | 9/2001 | Wang | |
| 2001/0039509 A1 | 11/2001 | Dar et al. | |
| 2002/0022920 A1 | 2/2002 | Straub | |
| 2002/0024464 A1 | 2/2002 | Kovell et al. | |
| 2002/0095249 A1 | 7/2002 | Lang | |
| 2002/0111725 A1 | 8/2002 | Burge | |
| 2002/0111738 A1 | 8/2002 | Wami et al. | |
| 2002/0120396 A1 | 8/2002 | Boies et al. | |
| 2002/0128882 A1 | 9/2002 | Nakagawa et al. | |
| 2002/0178033 A1 | 11/2002 | Yoshioka et al. | |
| 2003/0043045 A1* | 3/2003 | Yasushi | A61M 21/00 340/576 |
| 2003/0097047 A1* | 5/2003 | Woltermann | G01C 21/3697 600/300 |
| 2003/0128107 A1 | 7/2003 | Wilkerson | |
| 2003/0182165 A1 | 9/2003 | Kato et al. | |
| 2003/0187704 A1 | 10/2003 | Hashiguchi et al. | |
| 2004/0021583 A1* | 2/2004 | Lau | G01C 21/3617 701/418 |
| 2004/0036601 A1* | 2/2004 | Obradovich | B60C 23/20 340/425.5 |
| 2004/0054452 A1 | 3/2004 | Bjorkman | |
| 2004/0068555 A1 | 4/2004 | Satou | |
| 2004/0098464 A1 | 5/2004 | Koch et al. | |
| 2004/0103006 A1 | 5/2004 | Wahlbin et al. | |
| 2004/0103010 A1 | 5/2004 | Wahlbin et al. | |
| 2004/0128613 A1 | 7/2004 | Sinisi | |
| 2004/0142678 A1 | 7/2004 | Krasner | |
| 2004/0153362 A1 | 8/2004 | Bauer et al. | |
| 2004/0236476 A1 | 11/2004 | Chowdhary | |
| 2004/0254698 A1 | 12/2004 | Hubbard et al. | |
| 2004/0260579 A1 | 12/2004 | Tremiti | |
| 2005/0091175 A9 | 4/2005 | Farmer | |
| 2005/0107951 A1 | 5/2005 | Brulle-Drews et al. | |
| 2005/0137757 A1 | 6/2005 | Phelan et al. | |
| 2005/0174217 A1 | 8/2005 | Basir et al. | |
| 2005/0228622 A1 | 10/2005 | Jacobi | |
| 2005/0256638 A1* | 11/2005 | Takahashi | G01C 21/3461 340/995.19 |
| 2005/0264404 A1 | 12/2005 | Franczyk et al. | |
| 2005/0273263 A1* | 12/2005 | Egami | G08G 1/163 340/436 |
| 2005/0283503 A1 | 12/2005 | Hancock et al. | |
| 2005/0288046 A1 | 12/2005 | Zhao et al. | |
| 2006/0006990 A1 | 1/2006 | Obradovich | |
| 2006/0053038 A1 | 3/2006 | Warren et al. | |
| 2006/0055565 A1 | 3/2006 | Kawamata et al. | |
| 2006/0095301 A1 | 5/2006 | Gay | |
| 2006/0129313 A1 | 6/2006 | Becker et al. | |
| 2006/0129445 A1 | 6/2006 | McCallum | |
| 2006/0161341 A1 | 7/2006 | Haegebarth et al. | |
| 2006/0184321 A1 | 8/2006 | Kawakami et al. | |
| 2006/0206623 A1 | 9/2006 | Gipps et al. | |
| 2006/0221328 A1 | 10/2006 | Rouly | |
| 2006/0247852 A1 | 11/2006 | Kortge et al. | |
| 2006/0253307 A1 | 11/2006 | Warren et al. | |
| 2006/0293838 A1* | 12/2006 | Yamamoto | G09B 19/00 701/532 |
| 2007/0021910 A1* | 1/2007 | Iwami | G08G 1/096838 701/431 |
| 2007/0027583 A1 | 2/2007 | Tamir et al. | |
| 2007/0032929 A1* | 2/2007 | Yoshioka | G08G 1/166 701/1 |
| 2007/0136107 A1 | 6/2007 | Maguire et al. | |
| 2007/0167147 A1 | 7/2007 | Krasner et al. | |
| 2007/0182532 A1 | 8/2007 | Lengning et al. | |
| 2007/0216521 A1 | 9/2007 | Guensler et al. | |
| 2007/0256499 A1 | 11/2007 | Pelecanos et al. | |
| 2007/0257815 A1 | 11/2007 | Gunderson et al. | |
| 2007/0282638 A1 | 12/2007 | Surovy | |
| 2008/0004802 A1 | 1/2008 | Horvitz | |
| 2008/0013789 A1 | 1/2008 | Shima et al. | |
| 2008/0033637 A1 | 2/2008 | Kuhlman et al. | |
| 2008/0033638 A1* | 2/2008 | Hirayama | G01C 21/3679 701/532 |
| 2008/0059007 A1 | 3/2008 | Whittaker et al. | |
| 2008/0059351 A1 | 3/2008 | Richey et al. | |
| 2008/0091309 A1 | 4/2008 | Walker | |
| 2008/0091490 A1 | 4/2008 | Abrahams et al. | |
| 2008/0114542 A1 | 5/2008 | Nambata et al. | |
| 2008/0148409 A1 | 6/2008 | Ampunan et al. | |
| 2008/0161987 A1 | 7/2008 | Breed | |
| 2008/0167757 A1* | 7/2008 | Kanevsky | G07C 5/085 701/1 |
| 2008/0243558 A1 | 10/2008 | Gupte | |
| 2008/0258890 A1 | 10/2008 | Follmer et al. | |
| 2008/0288406 A1 | 11/2008 | Seguin et al. | |
| 2008/0294337 A1* | 11/2008 | Dawson | G01C 21/26 701/533 |
| 2008/0319602 A1 | 12/2008 | McClellan et al. | |
| 2009/0012703 A1 | 1/2009 | Aso et al. | |
| 2009/0024419 A1 | 1/2009 | McClellan et al. | |
| 2009/0063201 A1 | 3/2009 | Nowotarski et al. | |
| 2009/0079839 A1 | 3/2009 | Fischer et al. | |
| 2009/0115638 A1 | 5/2009 | Shankwitz et al. | |
| 2009/0140887 A1 | 6/2009 | Breed et al. | |
| 2009/0210257 A1* | 8/2009 | Chalfant | B60W 40/09 705/4 |
| 2009/0312945 A1 | 12/2009 | Sakamoto et al. | |
| 2010/0009326 A1* | 1/2010 | Mori | A61B 5/18 600/300 |
| 2010/0023183 A1 | 1/2010 | Huang et al. | |
| 2010/0030586 A1 | 2/2010 | Taylor et al. | |
| 2010/0042314 A1 | 2/2010 | Vogt et al. | |
| 2010/0131300 A1 | 5/2010 | Collopy et al. | |
| 2010/0131304 A1 | 5/2010 | Collopy et al. | |

(56) References Cited

U.S. PATENT DOCUMENTS

| | | |
|---|---|---|
| 2010/0131307 A1 | 5/2010 | Collopy et al. |
| 2010/0138244 A1 | 6/2010 | Basir |
| 2010/0211270 A1 | 8/2010 | Chin et al. |
| 2010/0238009 A1* | 9/2010 | Cook ............... G07C 5/00 340/439 |
| 2010/0250087 A1 | 9/2010 | Sauter |
| 2010/0256852 A1 | 10/2010 | Mudalige |
| 2010/0280751 A1 | 11/2010 | Breed |
| 2010/0302371 A1 | 12/2010 | Abrams |
| 2010/0324775 A1 | 12/2010 | Kermani et al. |
| 2010/0332131 A1 | 12/2010 | Horvitz et al. |
| 2011/0029170 A1 | 2/2011 | Hyde et al. |
| 2011/0043350 A1* | 2/2011 | Ben David ......... G08B 21/06 340/576 |
| 2011/0071718 A1 | 3/2011 | Norris et al. |
| 2011/0077028 A1* | 3/2011 | Wilkes, III ......... B60W 30/08 455/456.3 |
| 2011/0161116 A1* | 6/2011 | Peak .................. G16H 10/60 345/173 |
| 2011/0161119 A1 | 6/2011 | Collins |
| 2011/0173015 A1 | 7/2011 | Chapman et al. |
| 2011/0202305 A1 | 8/2011 | Willis et al. |
| 2011/0210867 A1 | 9/2011 | Benedikt |
| 2011/0224875 A1* | 9/2011 | Cuddihy ............. B60W 10/18 701/1 |
| 2012/0034876 A1 | 2/2012 | Nakamura et al. |
| 2012/0053808 A1 | 3/2012 | Arai et al. |
| 2012/0072243 A1 | 3/2012 | Collins et al. |
| 2012/0083960 A1 | 4/2012 | Zhu et al. |
| 2012/0101660 A1 | 4/2012 | Hattori |
| 2012/0109418 A1 | 5/2012 | Lorber |
| 2012/0123641 A1 | 5/2012 | Ferrin et al. |
| 2012/0123806 A1* | 5/2012 | Schumann, Jr. ...... G06Q 40/08 705/4 |
| 2012/0150429 A1* | 6/2012 | Siotos ............... G01C 21/3617 701/411 |
| 2012/0150430 A1* | 6/2012 | French .............. G01C 21/3453 701/425 |
| 2012/0173290 A1 | 7/2012 | Collins et al. |
| 2012/0197669 A1 | 8/2012 | Kote et al. |
| 2012/0209505 A1 | 8/2012 | Breed et al. |
| 2012/0290146 A1 | 11/2012 | Dedes et al. |
| 2012/0295592 A1 | 11/2012 | Peirce |
| 2012/0330173 A1* | 12/2012 | Park .................. A61B 5/18 600/509 |
| 2013/0006469 A1 | 1/2013 | Green et al. |
| 2013/0006674 A1 | 1/2013 | Bowne et al. |
| 2013/0006675 A1 | 1/2013 | Bowne et al. |
| 2013/0009761 A1* | 1/2013 | Horseman .......... A61B 5/6893 340/576 |
| 2013/0013179 A1 | 1/2013 | Lection et al. |
| 2013/0018549 A1* | 1/2013 | Kobana ............. B60K 28/06 701/41 |
| 2013/0030606 A1 | 1/2013 | Mudalige et al. |
| 2013/0037650 A1 | 2/2013 | Heppe |
| 2013/0046559 A1 | 2/2013 | Coleman et al. |
| 2013/0052614 A1 | 2/2013 | Mollicone et al. |
| 2013/0066511 A1 | 3/2013 | Switkes et al. |
| 2013/0073321 A1 | 3/2013 | Hofmann et al. |
| 2013/0090821 A1 | 4/2013 | Abboud et al. |
| 2013/0116920 A1 | 5/2013 | Cavalcante et al. |
| 2013/0131906 A1 | 5/2013 | Green et al. |
| 2013/0144657 A1 | 6/2013 | Ricci |
| 2013/0147638 A1 | 6/2013 | Ricci |
| 2013/0166325 A1 | 6/2013 | Ganapathy et al. |
| 2013/0179198 A1 | 7/2013 | Bowne et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0203400 A1 | 8/2013 | Ricci |
| 2013/0204645 A1 | 8/2013 | Lehman et al. |
| 2013/0212659 A1 | 8/2013 | Maher et al. |
| 2013/0218603 A1 | 8/2013 | Hagelstein et al. |
| 2013/0218604 A1 | 8/2013 | Hagelstein et al. |
| 2013/0226441 A1 | 8/2013 | Horita |
| 2013/0250933 A1 | 9/2013 | Yousefi et al. |
| 2013/0253809 A1 | 9/2013 | Jones et al. |
| 2013/0261944 A1 | 10/2013 | Koshizen |
| 2013/0297097 A1 | 11/2013 | Fischer et al. |
| 2013/0304513 A1 | 11/2013 | Hyde et al. |
| 2013/0304514 A1 | 11/2013 | Hyde et al. |
| 2013/0311002 A1 | 11/2013 | Isaac |
| 2014/0037938 A1 | 2/2014 | Li et al. |
| 2014/0074512 A1 | 3/2014 | Hare et al. |
| 2014/0080098 A1 | 3/2014 | Price |
| 2014/0088855 A1 | 3/2014 | Ferguson |
| 2014/0108058 A1 | 4/2014 | Bourne et al. |
| 2014/0113619 A1 | 4/2014 | Tibbitts et al. |
| 2014/0136414 A1 | 5/2014 | Abhyanker |
| 2014/0139341 A1 | 5/2014 | Green et al. |
| 2014/0156133 A1 | 6/2014 | Cullinane et al. |
| 2014/0156134 A1 | 6/2014 | Cullinane et al. |
| 2014/0172221 A1 | 6/2014 | Solyom et al. |
| 2014/0172290 A1 | 6/2014 | Prokhorov et al. |
| 2014/0180723 A1 | 6/2014 | Cote et al. |
| 2014/0199662 A1* | 7/2014 | Armitage ......... G06Q 10/06398 434/65 |
| 2014/0200800 A1* | 7/2014 | Vogel ................ G01C 21/3453 701/400 |
| 2014/0210644 A1 | 7/2014 | Breed |
| 2014/0257869 A1* | 9/2014 | Binion ................ G06Q 40/08 705/4 |
| 2014/0257871 A1 | 9/2014 | Christensen et al. |
| 2014/0257873 A1 | 9/2014 | Hayward et al. |
| 2014/0266795 A1 | 9/2014 | Tseng et al. |
| 2014/0272810 A1 | 9/2014 | Fields et al. |
| 2014/0276090 A1* | 9/2014 | Breed ................. A61B 5/1455 600/473 |
| 2014/0278586 A1 | 9/2014 | Sanchez et al. |
| 2014/0300458 A1 | 10/2014 | Bennett |
| 2014/0300494 A1 | 10/2014 | Tseng et al. |
| 2014/0303827 A1 | 10/2014 | Dolgov et al. |
| 2014/0310075 A1 | 10/2014 | Ricci |
| 2014/0310186 A1 | 10/2014 | Ricci |
| 2014/0330505 A1* | 11/2014 | Wenneman ........ G08G 1/096827 701/117 |
| 2014/0333468 A1 | 11/2014 | Zhu et al. |
| 2014/0335902 A1 | 11/2014 | Guba et al. |
| 2014/0350970 A1 | 11/2014 | Schumann, Jr. et al. |
| 2014/0358413 A1 | 12/2014 | Trombley et al. |
| 2014/0379384 A1 | 12/2014 | Duncan et al. |
| 2014/0379385 A1 | 12/2014 | Duncan et al. |
| 2014/0380264 A1 | 12/2014 | Misra et al. |
| 2015/0019266 A1 | 1/2015 | Stempora |
| 2015/0025917 A1 | 1/2015 | Stempora |
| 2015/0045986 A1* | 2/2015 | Kan .................... B60W 40/08 701/1 |
| 2015/0051826 A1* | 2/2015 | Basson .............. G01C 21/3697 701/437 |
| 2015/0057931 A1* | 2/2015 | Pivonka ............. G01C 21/3484 701/533 |
| 2015/0081404 A1 | 3/2015 | Basir |
| 2015/0088334 A1 | 3/2015 | Bowers et al. |
| 2015/0088550 A1 | 3/2015 | Bowers et al. |
| 2015/0112543 A1 | 4/2015 | Binion et al. |
| 2015/0112730 A1 | 4/2015 | Binion et al. |
| 2015/0112731 A1 | 4/2015 | Binion et al. |
| 2015/0112733 A1 | 4/2015 | Baker et al. |
| 2015/0120124 A1 | 4/2015 | Bartels et al. |
| 2015/0134181 A1 | 5/2015 | Ollis |
| 2015/0142244 A1 | 5/2015 | You et al. |
| 2015/0149017 A1 | 5/2015 | Attard et al. |
| 2015/0149019 A1 | 5/2015 | Pilutti et al. |
| 2015/0158486 A1 | 6/2015 | Healey et al. |
| 2015/0161738 A1 | 6/2015 | Stempora |
| 2015/0166059 A1 | 6/2015 | Ko |
| 2015/0166062 A1 | 6/2015 | Johnson et al. |
| 2015/0166069 A1 | 6/2015 | Engelman et al. |
| 2015/0170287 A1 | 6/2015 | Tirone et al. |
| 2015/0175168 A1 | 6/2015 | Hoye et al. |
| 2015/0179062 A1 | 6/2015 | Ralston et al. |
| 2015/0187013 A1 | 7/2015 | Adams et al. |

(56) References Cited

U.S. PATENT DOCUMENTS

| | | | |
|---|---|---|---|
| 2015/0187014 A1* | 7/2015 | Adams | G06Q 40/08 |
| | | | 705/4 |
| 2015/0187015 A1 | 7/2015 | Adams et al. | |
| 2015/0187019 A1 | 7/2015 | Fernandes et al. | |
| 2015/0194055 A1 | 7/2015 | Maass | |
| 2015/0217763 A1 | 8/2015 | Reichel et al. | |
| 2015/0242953 A1 | 8/2015 | Suiter | |
| 2015/0248131 A1 | 9/2015 | Fairfield et al. | |
| 2015/0254955 A1 | 9/2015 | Fields et al. | |
| 2015/0260531 A1* | 9/2015 | Ehsani | G01C 21/3484 |
| | | | 701/538 |
| 2015/0266455 A1 | 9/2015 | Wilson | |
| 2015/0285653 A1* | 10/2015 | Kim | B60W 40/04 |
| | | | 701/423 |
| 2015/0294422 A1* | 10/2015 | Carver | G06Q 40/08 |
| | | | 705/4 |
| 2016/0009291 A1 | 1/2016 | Pallett et al. | |
| 2016/0036558 A1 | 2/2016 | Ibrahim et al. | |
| 2016/0065116 A1 | 3/2016 | Conger | |
| 2016/0086285 A1 | 3/2016 | Jordan Peters et al. | |
| 2016/0086393 A1* | 3/2016 | Collins | A61B 5/024 |
| | | | 701/31.5 |
| 2016/0089954 A1* | 3/2016 | Rojas Villanueva | |
| | | | B60H 1/00742 |
| | | | 701/36 |
| 2016/0090097 A1* | 3/2016 | Grube | B60W 40/08 |
| | | | 340/576 |
| 2016/0091337 A1* | 3/2016 | Weast | A61B 5/02438 |
| | | | 701/439 |
| 2016/0096531 A1 | 4/2016 | Hoye et al. | |
| 2016/0123743 A1* | 5/2016 | Sisbot | G01C 21/3461 |
| | | | 701/538 |
| 2016/0156773 A1* | 6/2016 | Chanda | H04M 1/72403 |
| | | | 455/414.1 |
| 2016/0163198 A1* | 6/2016 | Dougherty | G08G 1/162 |
| | | | 340/905 |
| 2016/0167652 A1 | 6/2016 | Slusar | |
| 2016/0189303 A1 | 6/2016 | Fuchs | |
| 2016/0209228 A1* | 7/2016 | Golding | G01C 21/3484 |
| 2017/0011465 A1 | 1/2017 | Anastassov et al. | |
| 2017/0021764 A1 | 1/2017 | Adams et al. | |
| 2017/0120929 A1 | 5/2017 | Siddiqui et al. | |
| 2017/0154636 A1 | 6/2017 | Geiger et al. | |
| 2017/0210288 A1* | 7/2017 | Briggs | B60W 30/08 |
| 2017/0219364 A1 | 8/2017 | Lathrop et al. | |
| 2017/0221149 A1 | 8/2017 | Hsu-Hoffman et al. | |
| 2017/0255966 A1 | 9/2017 | Khoury | |
| 2018/0037635 A1 | 2/2018 | Grimm et al. | |
| 2018/0202822 A1 | 7/2018 | DeLizio | |
| 2018/0251128 A1 | 9/2018 | Penilla et al. | |
| 2018/0376357 A1 | 12/2018 | Tavares Coutinho et al. | |
| 2019/0101649 A1 | 4/2019 | Jensen | |

FOREIGN PATENT DOCUMENTS

| | | | |
|---|---|---|---|
| EP | 1296305 A1 | 3/2003 | |
| EP | 2293255 A1 | 3/2011 | |
| EP | 2471694 A2 | 7/2012 | |
| EP | 3303083 A1 | 4/2018 | |
| WO | 2001039090 A1 | 5/2001 | |
| WO | 2005108928 A1 | 11/2005 | |
| WO | 2007102405 A1 | 9/2007 | |
| WO | 2008067872 A1 | 6/2008 | |
| WO | 2008096376 A1 | 8/2008 | |
| WO | 2012014042 A2 | 2/2012 | |
| WO | 2012150591 A2 | 11/2012 | |
| WO | 2013012926 A1 | 1/2013 | |
| WO | 2013126582 A1 | 8/2013 | |
| WO | 2013160908 A2 | 10/2013 | |
| WO | 2014148975 A1 | 9/2014 | |
| WO | WO 2016/028228 * | 8/2015 | G06F 19/00 |
| WO | 2016028228 A1 | 2/2016 | |
| WO | 2016122881 A1 | 8/2016 | |
| WO | 2016200762 A1 | 12/2016 | |

OTHER PUBLICATIONS

K. Soman, et al, "Analysis of physiological signals in response to stress using ECG and respiratory signals of automobile drivers," 2013 International Mutli-Conference on Automation, Computing, Communication, Control and Compressed Sensing (iMac4s), Kottayam, India, 2013, pp. 574-579. (Year: 2013).*

O. Dehzangi and C. Williams, "Towards multi-modal wearable driver monitoring: Impact of road condition on driver distraction," 2015 IEEE 12th International Conference on Wearable and Implantable Body Sensor Networks (BSN), Cambridge, MA, USA, 2015, pp. 1-6 (Year: 2015).*

"A leader-follower formation flight control scheme for UAV helicopters," Abstract downloaded on Dec. 19, 2013 from http://ieeexplore.ieee.org/xpl/login.jsp?tp=&arnumber=4636116&url=http%3A%2F%2Fi . . . , 1 page.

"A semi-autonomous tractor in an intelligent master-slave vehicle system," Oct. 2010, vol. 3, Issue 4, pp. 263-269, downloaded Dec. 19, 2013 from http://link.springer.com/article/10.1007%2Fs11370-010-0071-6, 4 pages.

"A velocity control strategy for vehicular collision avoidance system," Abstract downloaded on May 9, 2013 from eeexplore.ieee.org/xpl/articleDetails.jsp?tp=&arnumber=1626838&contentType=Conference+PublicationsqueryText%3DA+velocity+control+strategy+for . . . , 1 page.

"Autonomous Car," Wikipedia, the free encyclopedia, downloaded Nov. 11, 2013 from en.wikipedia.org/wiki/Autonomous_car#cite_ref-28, 20 pages.

"Background on Self-Driving Cars and Insurance", Auto Technology, Insurance Information Institute, Inc. (Year 2018).

"Chassis Systems Control, Adaptive Cruise Control: More comfortable driving," Robert Bosch GmbH, Brochure downloaded Oct. 26, 2013, 4 pages.

"Development of an intelligent master-slave system between agricultural vehicles," Abstract downloaded on Dec. 19, 2013 from http://ieeexplore.ieee.org/xpl/login.jsp?tp=&arnumber=5548056&url=http%3A%2F%2Fi . . . , 1 page.

"Direct adaptive longitudinal control of vehicle platoons," Abstract downloaded on May 9, 2013 from ieeexplore.ieee.org/xpl/articleDetails.jsp?tp=&arnumber=917908&contentType=Journals+%26+Magazines&queryText%3DDirect+adaptive+longitudinal+c . . . , 1 page.

"Driver Assistance Systems," Robert Bosch GmbH, downloaded Oct. 27, 2013 from www.bosch-automotivetechnology.us/en_us/us/driving_comfort_1/driving_comfort_systems_for_passenger_cars_2/driver_assistance_systems_5/driver_assistan . . . 12 pages.

"Driver Monitors: Improving Transportation Safety and Enhancing Performance Through Behavioral Change", Ballard, T., Melton, A., and Sealy, I., Society of Petroleum Engineers, Jan. 1, 2004, Year: 2004.

"Driverless cars study: 1 in 5 would let computers do the driving," Nov. 4, 2013, downloaded Dec. 19, 2013 from http://www.carinsurance.com/press/driverless-cars-survey-results.aspx, 2 pages.

"Fuzzy system representation of car-following phenomena," Abstract downloaded on May 9, 2013 from ieeexplore.ieee.org/xpl/articleDetails.jsp?tp=amnumber=527798contentType=Conference+Publications&queryText%3DFuzzy+system+representation+of . . . , 1 page.

"Get Ready for Automated Cars," Houston Chronicle, Sep. 11, 2012, downloaded Nov. 11, 2013, 1 page.

"Petri Net Modeling of the Cooperation Behavior of a Driver and a Copilot in an Advanced Driving Assistance System", Wu et al., IEEEE Transportation on Intelligent Transportation Systems, vol. 12, Issue 4, Dec. 1, 2011, pp. 977-989 (Year 2011).

"Preliminary Statement of Policy Concerning Automated Vehicles", National Highway Traffic Safety Administration, retrieved Jun. 9, 2014.

"Project SARTRE (Safe Road Trains for the Environment)," Road Traffic Technology, downloaded on May 9, 2013 from www.roadtraffic-technology.com/projects/the-sartre-project/, 3 pages.

(56) References Cited

OTHER PUBLICATIONS

"Schlaue Autos von A bis Z." Encyclopedia, downloaded Oct. 27, 2013 from www.bester-beifahrer.de/startseite/exikon/, 15 pages.
"Self-driving cars: The next revolution" (kpmg.com | cargroup.org), 2012, 36 pages.
"The Munix Advantage", AUMA, retrieved Apr. 8, 2014, <http://www.auma.ca/live/digitalAssets/71/71248_MUNIX_onepager.pdf>.
"The Use of Occupation and Education Factors in Automobile Insurance", State of New Jersey: Department of Banking and Insurance, Apr. 2008.
"Your Questions Answered: Driverless Cars", Stephen Harris, The Engine (Online), Feb. 17, 2014; n/a. ProQuest. Web Jan. 18, 2019 (Year 2014).
Jan. 1, 20155 (US) Non-Final Office Action—U.S. Appl. No. 14/163,761.
Jan. 2, 20151 (US) Non-Final Office Action—U.S. Appl. No. 14/163,719.
Apr. 7, 2016 (US) Non-Final Office Action—U.S. Appl. No. 14/163,719.
Aug. 31, 2016 (WO) International Search Report—App PCT/US2016/036136.
Dec. 12, 2016 (US) Notice of Allowance—U.S. Appl. No. 14/832,197.
Dec. 19, 2016 (US) Final Office Action—U.S. Appl. No. 14/607,433.
Dec. 29, 2016 (US) Non-Final Office Action—U.S. Appl. No. 14/458,764.
Jan. 29, 2016 (US) Notice of Allowance and Fee(s) Due—U.S. Appl. No. 14/163,741.
Jun. 22, 2016 (US) Non-Final Office Action—U.S. Appl. No. 14/607,433.
Mar. 17, 2016 (US) Notice of Allowance and Fee(s) Due—U.S. Appl. No. 14/163,761.
Mar. 18, 2016 (WO) International Search Report and Written Opinion—App PCT/US2016/013204.
Nov. 29, 2016 (US) Non-Final Office—U.S. Appl. No. 14/458,796.
Oct. 6, 2016 (US) Non-Final Office Action—U.S. Appl. No. 14/184,272.
Oct. 17, 2016 (US) Office Action—U.S. Appl. No. 13/892,598.
Oct. 20, 2016 (US) Non-Final Office Action—U.S. Appl. No. 14/816,336.
Oct. 21, 2016 (US) Non-Final Office Action—U.S. Appl. No. 14/862,266.
Oct. 24, 2016 (US) Non-Final Office Action—U.S. Appl. No. 14/816,299.
Oct. 3, 2016 (US) Non-Final Office Action—U.S. Appl. No. 14/733,576.
Sep. 9, 2016 (US) Non-Final Office Action—U.S. Appl. No. 14/697,141.
Sep. 9, 2016 (US) Notice of Allowance—U.S. Appl. No. 14/163,719.
Sep. 9, 2016 (US) Non-Final Office Action—U.S. Appl. No. 14/697,131.
Sep. 9, 2016 (US) Non-Final Office Action—U.S. Appl. No. 14/697,153.
Apr. 21, 2017 (US) Non-Final Office Action—U.S. Appl. No. 15/206,521.
Apr. 21, 2017 (US) Non-Final Office Action—U.S. Appl. No. 14/862,266.
Apr. 28, 2017 (WO) International Search Report—PCT/US17/16176.
Apr. 5, 2017 (US) Final Office Action—U.S. Appl. No. 14/184,272.
Apr. 6, 2017 (US) Non-Final Office Action—U.S. Appl. No. 14/697,153.
Apr. 6, 2017 (US) Non-Final Office Action—U.S. Appl. No. 14/816,336.
Apr. 7, 2017 (US) Non-Final Office Action—U.S. Appl. No. 14/816,299.
Dec. 18, 2020—(US) Notice of Allowance—U.S. Appl. No. 16/117,069.
Dec. 30, 2020—(US) Notice of Allowance—U.S. Appl. No. 15/974,861.
Jan. 11, 2021—(US) Notice of Allowance—U.S. Appl. No. 16/021,593.
Leur, P.D., & Sayed, T. (2002) "Development of a Road Safety Risk Index", Transportation Research Record, 1784(1), 33-42 (Year: 2002).
Cafiso, S., La Cava, G., & Montella, A. (2007), "Safety Index for Evaluation of Two-Lane Rural Highways", Transportation research Record, 2019(1), 136-145, (Year: 2007).
Jan. 22, 2021—(US) Notice of Allowance—U.S. Appl. No. 15/890,701.
Feb. 10, 2021—(US) Notice of Allowance—U.S. Appl. No. 16/021,678.
Feb. 11, 2021—(EP) Examination Report—App. No. 168080984.
Mar. 10, 2021—(US) Notice of Allowance—U.S. Appl. No. 16/117,069.
Mar. 12, 2021—(US) Non-Final Office Action—U.S. Appl. No. 15/900,861.
Aug. 15, 2017 (US) Final Office Action—U.S. Appl. No. 14/458,744.
Aug. 22, 2017 (US) Non-Final Office Action—U.S. Appl. No. 14/673,150.
Aug. 30, 2017 (US) Notice of Allowance—U.S. Appl. No. 14/862,266.
Aug. 8, 2017 (US) Final Office Action—U.S. Appl. No. 15/015,623.
Dec. 20, 2017 (US) Notice of Allowance—U.S. Appl. No. 14/184,272.
Dec. 22, 2017 (US) Notice of Allowance—U.S. Appl. No. 14/733,576.
Dec. 26, 2017 (US) Notice of Allowance—U.S. Appl. No. 14/163,719.
Dec. 27, 2017 (US) Non-Final Office Action—U.S. Appl. No. 14/697,131.
Dec. 5, 2017 (US) Final Office Action—U.S. Appl. No. 14/816,336.
Feb. 10, 2017 (US) Final Office Action—U.S. Appl. No. 14/733,576.
Jan. 12, 2017 (US) Non-Final Office Action—U.S. Appl. No. 14/458,826.
Jan. 13, 2017 (US) Non-Final Office Action—U.S. Appl. No. 14/458,744.
Jan. 19, 2017 (US) Final Office Action—U.S. Appl. No. 14/673,150.
Jan. 4, 2017 (US) Non-Final Office Action—U.S. Appl. No. 14/697,131.
Jan. 4, 2017 (US) Non-Final Office Action—U.S. Appl. No. 14/697,141.
Jul. 13, 2017 (US) Non-Final Office Action—U.S. Appl. No. 14/733,576.
Jul. 27, 2017 (US) Final Office Action—U.S. Appl. No. 14/458,826.
Jun. 1, 2017 (US) Final Office Action—U.S. Appl. No. 14/458,796.
Jun. 13, 2017 (US) Final Office Action—U.S. Appl. No. 14/458,764.
Jun. 16, 2017 (US) Final Office Action—U.S. Appl. No. 14/697,131.
Jun. 2, 2017 (US) Non-Final Office Action—U.S. Appl. No. 14/607,433.
Jun. 6, 2017 (US) Final Office Action—U.S. Appl. No. 14/697,141.
Mar. 27, 2017 (US) Non-Final Office Action—U.S. Appl. No. 15/015,623.
May 19, 2017 (US) Notice of Allowance—U.S. Appl. No. 14/163,719.
Nov. 30, 2017 (US) Non-Final Office Action—U.S. Appl. No. 14/697,141.
Oct. 26, 2017 (US) Notice of Allowance—U.S. Appl. No. 15/206,521.
Oct. 3, 2017 (US) Non-Final Office Action—U.S. Appl. No. 14/458,796.
Oct. 5, 2017 (US) Final Office Action—U.S. Appl. No. 14/607,433.
Oct. 6, 2017 (US) Final Office Action—U.S. Appl. No. 14/697,153.
Sep. 21, 2017 (US) Final Office Action—U.S. Appl. No. 14/816,299.
Sep. 7, 2017 (US) Non-Final Office Action—U.S. Appl. No. 14/458,764.
Apr. 19, 2018 (US) Final Office Action—U.S. Appl. No. 14/458,7640.
Apr. 2, 2018 (US) Non-Final Office Action—U.S. Appl. No. 14/816,336.
Apr. 2, 2018 (US) Notice of Allowance—U.S. Appl. No. 14/697,153.
Aug. 14, 2018—(US) Notice of Allowance—U.S. Appl. No. 14/607,433.
Dec. 6, 2018—(US) Notice of Allowance—U.S. Appl. No. 15/013,523.
Feb. 12, 2018 (US) Notice of Allowance—U.S. Appl. No. 14/673,150.
Feb. 7, 2018 (US) Non-Final Office Action—U.S. Appl. No. 15/166,638.
Jan. 8, 2018 (US) Non-Final Office Action—U.S. Appl. No. 15/015,623.
Jun. 14, 2018—(US) Final Office Action—U.S. Appl. No. 14/458,796.
Jun. 5, 2018—(CA) Office Action—App 2,975,087.
Jun. 6, 2018—(US) Notice of Allowance—U.S. Appl. No. 15/015,623.
Mar. 13, 2018 (US) Notice of Allowance—U.S. Appl. No. 15/206,521.
Mar. 14, 2018 (US) Non-Final Office Action—U.S. Appl. No. 14/607,433.
Mar. 29, 2018 (US) Notice of Allowance—U.S. Appl. No. 14/697,141.
Mar. 30, 2018 (US) Notice of Allowance—U.S. Appl. No. 14/816,299.
Mar. 9, 2018 (US) Non-Final Office Action—U.S. Appl. No. 15/013,523.
May 14, 2018 (US) Non-Final Office Action—U.S. Appl. No. 14/458,826.
May 15, 2018 (US) Notice of Allowance—U.S. Appl. No. 14/163,719.
May 17, 2018 (US) Notice of Allowance—U.S. Appl. No. 14/697,131.
Jun. 9, 2020—(US) Notice of Allowance—U.S. Appl. No. 16/102,089.
Mar. 19, 2020—(US) Non-Final Office Action—U.S. Appl. No. 16/294,103.
May 21, 2020—(US) Notice of Allowance—U.S. Appl. No. 14/458,744.
Nov. 16, 2020—(US) Notice of Allowance—U.S. Appl. No. 15/890,701.
Oct. 14, 2020—(US) Non-Final Office Action—U.S. Appl. No. 16/021,678.
Sep. 2, 2020—(US) Notice of Allowance—U.S. Appl. No. 16/294,103.
Sep. 21, 2020—(US) Non-Final Office Action—U.S. Appl. No. 15/974,861.

(56) References Cited

OTHER PUBLICATIONS

Advanced Tracking Technologies, Inc., Shadow Tracker Prov5 Track Detail Map, http://www.advantrack.com/map_pro_3.htm; 1 page; downloaded Jun. 25, 2008.
Advanced Tracking Technologies, Inc.; Track Playback; http://www.advantrack.com/Animated-Track-Playback.htm; 1 page; downloaded Jun. 25, 2008.
Anderson, James M. et al., "Autonomous Vehicle Program: A Guide for Policymakers", Rand Corporation: Transportation, Space, and Technology Program, 2014.
Auto Insurance Discounts, Liberty Mutual Insurance, downloaded from http://www.libertymutual.com/auto-insurance/auto-insurance-coverage/auto-insurance-discounts, Jan. 8, 2014, 2 pages.
Autonomous Vehicles Regulations, California Department of Motor Vehicles, 2011, downloaded from www.dmv.ca.gov/vr/autonomous/auto.htm, Jan. 2, 2014, 3 pages.
Bai, Fan et al., "Reliability Analysis of DSRC Wireless Communication for Vehicle Safety"; Sep. 2006.
Baronti, et al., "Distributed Sensor for Steering Wheel Grip Force Measurement in Driver Fatigue Detection," Department of Engineering and Information, University of Pisa, Italy, pp. 1-4. (Year: 2009).
BC Technology Webpage; "CarCom Intercom System"; www.bctechnologyltd.co.uk/clarson-intercom-system-brochure.htm; downloaded May 29, 2013.
BMW.com webpage; "BMW Technology Guide: Car-to-car communication" www.bmw.com/com/en/insights/technology/technology_guide/articles/cartocar_communication.html; downloaded Apr. 5, 2013.
Bylund, Anders, "Would You Buy a Self-Driving Car to Save 80% on Auto Insurance?" The Motley Fool, Nov. 27, 2013, http://www.dailyfinance.com/2013/11/27/would-you-buy-a-self-driving-car-to-save-80-on-car/, 2 pages.
Car-to-Car webpage; "Car-2-Car Communication"; www.car-to-car.org/index.php?id=8; downloaded May 29, 2013.
Cohda Wireless webpage; www.cohdawireless.com/default.html; downloaded May 29, 2013.
Cusano et al., "Driverless Cars Will Change Auto Insurance. Here's How Insurers Can Adapt", Business Models, Harvard Business School Publishing Corporation, Dec. 2017.
Digital Collection—Metadata View; Quad City Intersection Traffic Accident Study: 1993 Data; http://ntlsearch.bts.gov/tris/record/ntl/338.html; 2 pages; downloaded Jun. 25, 2008.
Doug Newcomb., "Autonomous Cars will Usher in Things We Never Saw Coming," Opinions, PC Magazine Digital Edition, pp. 1-4, (Year: 2016).
EE Herald webpage, "DSRC Packet Sniffer, a vehicle-to-vehicle communication technology is under demo"; www.eeherald.com/section/news/nw10000198.html; dated Nov. 22, 2008.
Eichler, Stephen et al., "Car-to-Car Communication" dated Oct. 2006.
Festag et al., "Vehicle-to-vehicle and road-side sensor communication for enhanced road safety"; Nov. 2008.
Final Report: What Value May Geographic Information Systems Add to the Art of Identifying Crash Countermeasures? John S. Miller, Senior Research Scientist, Virginia Transportation Research Council, Charlottesville, Virginia, Apr. 1999; http://www.virginiadot.org/vtrc/main/online_reports/pdf/99-r13.pdf, 44 pages; downloaded Apr. 8, 2008.
Geographic Information Systems Using CODES Linked Data (Crash Outcome Data Evaluation System), U.S. Department of Transportation National Highway Traffic Safety Administration, Apr. 2001; http://ntl.bts.gov/lib/11000/11100/11149/809-201.pdf; 44 pages; downloaded Apr. 8, 2008.
Group1 Software; Point-Level Geocoding Option Geocoding Enrichment Solution; http://www.g1.com/PDF/Product/PointLevelGeocode.pdf; 2 pages; downloaded Apr. 8, 2008.
Harris, Stephen., "Your Questions Answered: Driverless Cars," The Engineer (Online) Feb. 17, 2014: n/a. ProQuest. Web. Jan. 18, 2019 (Year: 2014).

How the Discounts Work; www.SaveAsYouDrive.com; http://www.saveasyouddrive.com/page.asp?pageid=34&print=true; 2 pages; downloaded Jun. 25, 2008.
Ingolfo, Silvia, and Silva Souza, Vitor E., "Law and Adaptivity in Requirements Engineering," SEAMS 2013, pp. 163-168.
Integrated Enterprise Geo-Spatial Technology—Insurance Risk Examples by Brady Foust, Ph.D., Howard Botts, Ph.D. and Margaret Miller, Ph.D., Jan. 27, 2006; http://www.directionsmag.com/printer.php?article_id-2081; 2 pages; downloaded Jun. 25, 2008.
IVOX's Driver Score; Personal Lines; Benefits to using IVOX DriverScore; http://www.ivosdata.com/personal_lines.html; 1 page; downloaded Jul. 25, 2008.
J.F. Coughlin, B. Reimer, B. Mehler, "Monitoring Managing and Motivating Driver Safety and Well-Being", IEEE Pervasive Comput., vol. 10 No. 3, pp. 14-21, Year 2011.
Ji, et al., "Real-Time Nonintrusive Monitoring and Prediction of Driver Fatigue," IEEE Transactions on Vehicular Technology, vol. 53, No. 4, pp. 1-17 (Year: 2004).
Kim, Mun Hyun, Dickerson, Julie, Kosko, Bart, "Fuzzy throttle and brake control for platoons of smart cars," University of Southern California, revised Aug. 1995, downloaded Dec. 19, 2013, 26 pages.
Kirkpatrick, Keith, "Legal issues with Robots," Communications of the ACM, Nov. 2013, vol. 56 No. 11, pp. 17-19.
Kotani, Kazuya et al., "Inter-Vehicle Communication Protocol for Cooperatively Capturing and Sharing" Intersection Video; date unkown but believed to be before 2011.
Kurian, Bonny, "Auto-Insurance—Driving into the sunset?", Tala Consultancy Services, 2013.
Levy, Steven, Salmon, Felix, Stokes, Jon, "Artificial Intelligence is Here. In Fact, It's All Around US. But It's Nothing Like We Expected," Jan. 2011, 14 pages.
Lienert, Anita, Drivers Would Opt for Autonomous Cars to Save on Insurance, Study Finds: Published: Nov. 7, 2013, downloaded from www.edmunds.com/car-news/drivers-would-opt-for-autonomous-cars-to-save-on-insurance-study-finds.html on Jan. 2, 2014, 6 pages.
Light, Donald, "A Scenario: The End of Auto Insurance," May 8, 2012, downloaded Nov. 11, 2013 from ww. celent.com/reports/scenario-end-auto-insurance, 2 pages.
Litman, Todd, "Autonomous Vehicle Implementation Predictions Implications for Transport Planning," Victoria Transport Policy Institute, Dec. 23, 2013, 19 pages.
Logistics, Not Consumers, Best Early Market for Premium Traffic Information, Sep. 25, 2006; http://auto.ihs.com/news/2006/abi-premium-traffic.htm; 2 pages; downloaded Jun. 25, 2008.
Mapping the Streets of the World, Hilmar Schmundt, Speigel Online, May 12, 2006 03:37 PM, High Technology; http://www.spiegel.de/international/spiegel/0,1518,druck-415848,00.html; 2 pages; downloaded Jun. 25, 2008.
Marchant, Gary E. et al., "The Coming Collision Between Autonomous Vehicles and the Liability System", Santa Clara Law Review (vol. 52: No. 4 (Article 6)), Dec. 17, 2012.
NEC.com webpage; "Car2Car Communication" www/nec.com/en/global.onlinetv/en/society/car_commu_1:html; downloaded Apr. 5, 2013.
Neil, Dan, "Who's Behind the Wheel? Nobody. The driverless car is coming. And we all should be glad it is," Wall Street Journal (Online) [New York, N.Y] Sep. 24, 2012, downloaded from http://search.proquest.com on Jan. 8, 2014, 4 pages.
Neumann, Peter G. and Contributors, "Risks to the Public," ACM SIGSOFT Software Engineering Notes, Jul. 2012 vol. 37 No. 4, pp. 20-29.
Noguchi, Noboru, Will, Jeff, Reid, Joh, and Zhang, Qin, "Development of a master-slave robot system for farm operations," Computers and Electronics in Agriculture 44 (2004), 19 pages.
O'Brien, Christine, "Autonomous Vehicle Technology: Consideration for the Auto Insurance Industry", University Transportation Resource Center (The 2nd Connected Vehicles Symposium, Rutgers University), Jun. 17, 2013.
O'Donnell, Anthony, "Prepare for Deep Auto Insurance Premium Drop Scenario, Celent Report Advises," Insurance & Technology, May 8, 2012, downloaded from http://www.insurancetech.com/claims/prepare-for-deep-auto-insurance-premium/232901645?printer_friendly=this-page, Jan. 9, 2014, 3 pages.

(56) References Cited

OTHER PUBLICATIONS

O'Donnell, Anthony, "Rapid Emergence of Driverless Cars Demands Creation of Legal Infrastructure, Stanford Scholar Says," Insurance & Technology—Online, Jan. 3, 2013, downloaded from http: 1 1 search.proquest.com .ezproxy.apollolibrary.com/ docview / 12 66 314 720 /fulltext/ 142 DA8916CC2 E861A14/ 11 ?accountid = 3 5812, Jan. 8, 2014, 2 pages.
Oki Webpage "Oki Develops World's First DSRC Inter-vehicle Communication Attachment for Mobile Phones to Help Pedestrian Safety" dated Jan. 8, 2009.
Patents: At the forefront of technological innovation, Printed from the Teleatlas.com website, 2007; http://www.teleatlas.com/WhyTeleAtlas/Innovation/Patents/index.htm; 1 page; downloaded Jun. 25, 2008.
Property/Casualty Insurance Gaining Position With Technology; Telematics, the use of Wireless communications and Global Positioning System (GPS) tracking, may soon change the way automobile insurance, both personal and commercial, is priced. Individual rating of a driver, to supplement class rating, now appears to be feasible.; http;//www.towersperrin.com/TILLINGHAST/publications/publications/emphasis/Emphasis_2005_3/Holderedge.pdf, 4 pages; downloaded Apr. 8, 2008.
Quad City Intersection Traffic Accident Study, Davenport-Rock Island-Moline Urbanized Area 1993 data, Bi-State Regional Commission, Mar. 1996; http://ntl.bts.gov/lib/000/300/338/00338.pdf; 78 pages; downloaded Apr. 8, 2008.
Ruquet, Mark E., "Who Insures a Driverless Car"? Property & Casualty 360, Oct. 1, 2012, downloaded from http:// search.proquest.com on Jan. 8, 2014, 2 pages.
Sharma, Aroma, Autonomous Vehicle Conf Recap 2012: "Driving the Future: The Legal Implications of Autonomous Vehicles," High Tech Law Institute, downloaded from law.scu.edu/hightech/autonomousvehicleconfrecap2012/, Jan. 2, 2014, 7 pages.
Sharma, Devansh, "Development of Leader-Follower Robot in IIT BOMBAY," 4 pages, retrieved May 30, 2013, date unknown, but prior to the filing date of this application.
Shladover, Steven E. "What if Cars Could Drive Themselves," ACCESS Magazine, University of California Transportation Center, UC Berkeley, Apr. 1, 2000, downloaded Dec. 19, 2013, 7 pages.
Strumpf, Dan, "Corporate News: Driverless Cars Face Issues of Liability", Strumpf Dan, The Wall Street Journal Asia [Hong Kong ] Jan. 29, 2013: 19, downloaded from http://search.proquest.com.ezproxy, Jan. 8, 2014, 2 pages.
Telephonics Webpage; "Integrated Communication Systems Wired & Wireless Secure Intercommunications"; www.telephonics.com/netcom.asp; downloaded May 29, 2013.
Test 2.
The autonomous car: The road to driverless driving, May 30, 2013, downloaded from analysis.telematicsupdate.com/v2x-safety/autonomous-car-road-driverless-driving on Jan. 2, 2014, 6 pages.
Top issues: An annual report "The insurance industry in 2013; Strategy: Reshaping auto insurance", vol. 5, 2013, 6 pages.
U.S. Appl. No. 61/391,271, filed Oct. 8, 2010, Appendix to the Specification, "Appendix B", (incorporated by reference in U.S. Appl. No. 61/391,271, filed Oct. 8, 2010, Zhu, J. et al)) (Year: 2010).
U.S. Appl. No. 61/391,271, filed Oct. 8, 2010, Specification, "Google 3.8-292" (incorporated by reference in US 2012-0083960 (Zhu, J. et al)) (Year: 2010).
U.S. Appl. No. 61/391,271, filed Oct. 8, 2010, Appendix to the Specification, "Appendix B", "User Interface for Displaying Internal State of Autonomous Driving System", Zhu et al., 37 pages (Year: 2010).
U.S. Appl. No. 61/391,271, filed Oct. 8, 2010, Specification, "Google 3.8-292", "Autonomous Vehicles", Zhu et al., 56 pages (Year: 2010).
VentureBeat.com webpage; "Cisco and NXP encourage car communication to make driving safer" www.venturebeat.com/2013/01/04/cisco-and-nxp-encourage-car-communication-to-make-driving-safer/, Rebecca Grant dated Jan. 4, 2013.

Walker Smith, Bryant, "Summary of levels of Driving Automation for On-Road Vehicles", Stanford Law School: The Center for Internet and Society, Dec. 18, 2013, <http://cyberlaw.stanford.edu/blog/2013/12/sae-levels-driving-automation>.
Wardzinski, Dynamic risk assessment in autonomous vehicles motion planning, IEEE, 1st International Conference on Information Technology, Gdansk, May 18-21, 2008 [retrieved on Jul. 25, 2016], Retrieved from the Internet, <URL:http://kio.pg.gda.pl/lag/download/2008-IEEE%20ICIS-Dynamic%20Risk%20Assessment.pdf>, 4 pages.
What is Geocoding?, http://www.trpc.org/programs/gis/geocode.htm; 5 pages; downloaded Jun. 25, 2008.
Wolf Intercom webpage; "Wolf Intercom Systems"; http://wolfintercom.com/; downloaded May 29, 2013.
Wu et al., "Petri Net Modeling of the Cooperation Behavior of a Driver and a Copilot in an Advanced Driving Assistance System", IEEE Transactions on Intelligent Transportation Systems, vol. 12, Issue 4, Dec. 1, 2011, pp. 977-989, Year 2011.
Xu, Qing et al., "Vehicle-to-Vehicle Safety Messaging in DSRC"; 2004.
Yang et al., "A vehicle-to-vehicle communication protocol for cooperative collision warning"; Aug. 2004.
Zalstein, David, Car Advice. com webpage, "First large-scale vehicle-to-vehicle communication technology test unveiled" dated Aug. 22, 2012, www.caradvice.com.au/187379/first-large-scale-vehicle-to-vehicle-communication-technology-test-unveiled/basic-rgb-4/, 3 pages.
Zeng, X., Yin, K., and Ge, H., "Hazardous Driving Prediction System," Submission to The Connected Vehicle Technology Challenge, Sep. 24, 2014, 20 pages.
Zhu et al., U.S. Appl. No. 61/391,271, filed Oct. 8, 2010, Appendix to the Specification, "Appendix B", "User Interface for Displaying Internal State of Autonomous Driving System", 37 pages, Year 2010.
Zhu et al., U.S. Appl. No. 61/391,271, filed Oct. 8, 2010, Specification "Google 3.8-392", "Autonomous Vehicles", 56 pages, Year 2010.
May 18, 2018 (US) Non-Final Office Action—U.S. Appl. No. 14/458,744.
Oct. 11, 2018—(US) Notice of Allowance—U.S. Appl. No. 15/206,521.
Oct. 22, 2018 (CA) Office Action—App. 2,988,134.
Sep. 17, 2018—(US) Notice of Allowance—U.S. Appl. No. 15/168,638.
Sep. 4, 2018—(US) Notice of Allowance—U.S. Appl. No. 14/816,336.
Apr. 5, 2019—(US) Notice of Allowance—U.S. Appl. No. 15/166,638.
Aug. 22, 2019—(US) Non-Final Office Action—U.S. Appl. No. 15/974,861.
Aug. 22, 2019—(US) Non-Final Office Action—U.S. Appl. No. 16/021,593.
Aug. 27, 2019—(US) Non-Final Office Action—U.S. Appl. No. 16/021,678.
Aug. 27, 2019—(US) Notice of Allowance—U.S. Appl. No. 15/166,638.
Dec. 11, 2019 (US) Non-Final Office Action—U.S. Appl. No. 16/102,089.
Dec. 12, 2019—(US) Non-Final Office Action—U.S. Appl. No. 15/827,860.
Feb. 11, 2019—(EP) Supplementary Search Report—EP16743839.9.
Jan. 23, 2019—(US) Final Office Action—U.S. Appl. No. 14/458,826.
Jan. 28, 2019—(US) Final Office Action—U.S. Appl. No. 14/458,744.
Jan. 8, 2019—(US) Notice of Allowance—U.S. Appl. No. 15/206,521.
Jul. 25, 2019—(US) Non-Final Office Action—U.S. Appl. No. 16/294,103.
Jun. 18, 2019 (US) Notice of Allowance and Fees Due—U.S. Appl. No. 15/206,521.
Jun. 26, 2019—(US) Non-Final Office Action—U.S. Appl. No. 14/458,744.
Mar. 21, 2019 (CA) Office Action—App. 2,975,087.
May 1, 2019—(US) Non-Final Office Action—U.S. Appl. No. 14/458,764.
May 15, 2019 (EP) European Extended Search Report—Application No. 16808098.4.
May 15, 2019 (EP) Extended European Search Report—App. 16808098.4.
May 3, 2019—(US) Non-Final Office Action—U.S. Appl. No. 14/458,796.

(56) References Cited

OTHER PUBLICATIONS

Nov. 25, 2019—(IN) Office Action—Application No. 201727043994.
Nov. 26, 2019 (US) Notice of Allowance—U.S. Appl. No. 15/166,638.
Nov. 4, 2019—(US) Notice of Allowance—U.S. Appl. No. 14/458,796.
Oct. 30, 2019—(US) Notice of Allowance—U.S. Appl. No. 14/458,764.
Oct. 31, 2019—(US) Notice of Allowance—U.S. Appl. No. 14/458,744.
Sep. 19, 2019—(US) Non-Final Office Action—U.S. Appl. No. 14/458,826.
Apr. 16, 2020—(US) Non-Final Office Action—U.S. Appl. No. 15/890,701.
Apr. 20, 2020—(US) Notice of Allowance—U.S. Appl. No. 15/206,521.
Apr. 20, 2020—(US) Notice of Allowance—U.S. Appl. No. 15/827,860.
Apr. 29, 2020—(US) Notice of Allowance—U.S. Appl. No. 15/900,861.
Aug. 18, 2020—(US) Final Office Action—U.S. Appl. No. 15/900,861.
Aug. 19, 2020—(US) Notice of Allowance—U.S. Appl. No. 15/827,860.
Aug. 21, 2020—(US) Non-Final Office Action—U.S. Appl. No. 16/021,593.
Aug. 26, 2020—(US) Notice of Allowance—U.S. Appl. No. 15/890,701.
Feb. 14, 2020—(US) Final Office Action—U.S. Appl. No. 16/021,678.
Feb. 26, 2020—(US) Notice of Allowance—U.S. Appl. No. 15/206,521.
Feb. 3, 2020—(US) Notice of Allowance—U.S. Appl. No. 14/458,744.
Feb. 4, 2020—(US) Notice of Allowance—U.S. Appl. No. 14/458,764.
Feb. 5, 2020—(US) Notice of Allowance—U.S. Appl. No. 14/458,796.
Feb. 6, 2020—(US) Final Office Action—U.S. Appl. No. 15/974,861.
Jan. 27, 2020—(US) Notice of Allowance—U.S. Appl. No. 14/458,826.
Jan. 31, 2020—(US) Final Office Action—U.S. Appl. No. 16/021,593.
Jun. 1, 2020—(US) Notice of Allowance—U.S. Appl. No. 14/458,826.
Jun. 18, 2020—(US) Notice of Allowance—U.S. Appl. No. 15/166,638.
Jun. 9, 2020—(US) Notice of Allowance—U.S. Appl. No. 14/458,764.
Jun. 9, 2020—(US) Notice of Allowance—U.S. Appl. No. 14/458,796.
Apr. 29, 2020—(US) Non-Final Office Action—U.S. Appl. No. 15/900,861, 140 pages.
Appendix to the Specification, "Appendix B" (incorporated by reference in U.S. Appl. No. 61/391,271, Zhu J., et al.,), of U.S. Appl. No. 61/391,271, dated Oct. 8, 2010, 37 pages.
International Preliminary Report on Patentability for International Application No. PCT/US2017/016176, mailed Aug. 16, 2018, 8 pages.
"Quad City Intersection Traffic Accident Study," Davenport-Rock Island-Moline Urbanized Area 1993 data, Bi-State Regional Commission, downloaded Apr. 8, 2008, Retrieved from the Internet: URL: http://ntl.bts.gov/lib/000/300/338/00338.pdf, Mar. 1996, 78 pages.

* cited by examiner

SUBJECTIVE ROUTE RISK MAPPING AND MITIGATION

CROSS REFERENCE TO RELATED APPLICATIONS

This application claims the benefit of and is a continuation of U.S. patent application Ser. No. 16/294,103, filed Mar. 6, 2019, and entitled "Subjective Route Risk Mapping and Mitigation," which is a continuation of and claims priority to U.S. patent application Ser. No. 15/013,523, filed Feb. 2, 2016, and entitled "Subjective Route Risk Mapping and Mitigation," which is related to U.S. patent application Ser. No. 14/100,913, filed Dec. 9, 2013, and entitled "Route Risk Mitigation," which is a continuation of U.S. patent application Ser. No. 12/118,021, filed May 9, 2008, issued Dec. 10, 2013, as U.S. Pat. No. 8,606,512. Each of the foregoing applications is incorporated by reference herein in its entirety.

TECHNICAL FIELD

Aspects of this disclosure relate generally to risk mitigation. More particularly, aspects of this disclosure relate to using geographically encoded information to promote and/or reward risk mitigation.

DESCRIPTION OF THE RELATED ART

Drivers may experience varying levels of ease and unease while driving a route in a vehicle. Although insurers may vary insurance premiums based on garaging location (by state, county, etc.), there is a need in the art for enhanced systems and methods to better account for variations in a location-based subjective risk experienced by drivers and subsequently acting accordingly. For example, some insurers use location-based technology such as GPS (global positioning satellites) to monitor the location of vehicles. Nevertheless, there is a need in the art for a technique for estimating the subjective risk associated with a route using the various aspects disclosed by the present invention. Therefore, there is a benefit in the art for an enhanced method and device for calculating a subjective risk for a road segment and using it to, among other things, mitigate risk.

SUMMARY

Aspects of this disclosure overcome problems and limitations of the prior art by providing a method for mitigating the risks associated with driving by assigning subjective risk values to road segments and using those risk values to select less subjectively risky travel routes.

Various approaches to helping users mitigate subjective risks are presented. In accordance with aspects of this disclosure, a system may include a vehicle, a computing device associated with a user travelling within the vehicle and/or a subjective risk analysis computing system that may be communicatively coupled to the computing device. In some cases, the computing device may receive input from the user when the user feels a sense of unease, or other subjective emotion, regarding a particular road segment, level of traffic, etc. The subjective risk analysis computing system may receive subjective risk information corresponding to the user's sense of unease regarding particular road segments and process the subjective risk information to determine a subjective risk score for each of a plurality of road segments along a route. In some cases, the input device may further include, or be communicatively coupled to, a pressure sensor (e.g., a pressure transducer) accessible to the user. The pressure transducer may generate a pressure signal corresponding to a level of unease being experienced by the user during a subjective risk event. In some cases, the subjective risk analysis computing system may analyze the pressure signal when determining the subjective risk score for each of a plurality of road segments along the route. In some cases, the subjective risk analysis system may be used to analyze a plurality of subjective risk scores corresponding to the plurality of road segments along a route. The plurality of subjective risk scores may correspond to aggregated information corresponding to a plurality of drivers that have traveled the same plurality of road segments and have experienced some form of unease while traveling along the route. In some cases, the input device may include one or more device in addition to, or in place of the pressure sensor, such as a button, a microphone for receiving a verbal input, a biometric sensor (e.g., a pulse sensor, a heartrate sensor, a blood pressure sensor, etc.), a device for receiving haptic feedback, an imaging device (e.g., a video camera, a still camera, etc.) that may be used to monitor eye movements, body language, and the like.

In some cases, a vehicle may include an input device accessible to an occupant of the vehicle. The input device may receive subjective risk information regarding the occupant's emotional reaction (e.g., a sense of ease or unease) regarding a plurality of road segments upon which the vehicle is travelling. In some cases, the input device may comprise a pressure transducer, a switch, a microphone, or other form of input device. The vehicle may further include a communication interface communicatively coupled to the input device. The communication interface may be used for communicating the subjective risk information via a wireless communication protocol to a remote computing system. In some cases, the remote computing system may include a subjective risk analysis engine that may be used for analyzing the subjective risk information received from the user to determine a subjective risk score associated with the user.

The details of these and other embodiments of this disclosure are set forth in the accompanying drawings and description below. Other features and advantages of aspects of this disclosure will be apparent from the description and drawings.

BRIEF DESCRIPTION OF THE DRAWINGS

Aspects of this disclosure may take physical form in certain parts and steps, embodiments of which will be described in detail in the following description and illustrated in the accompanying drawings that form a part hereof, wherein.

Figure 1A:
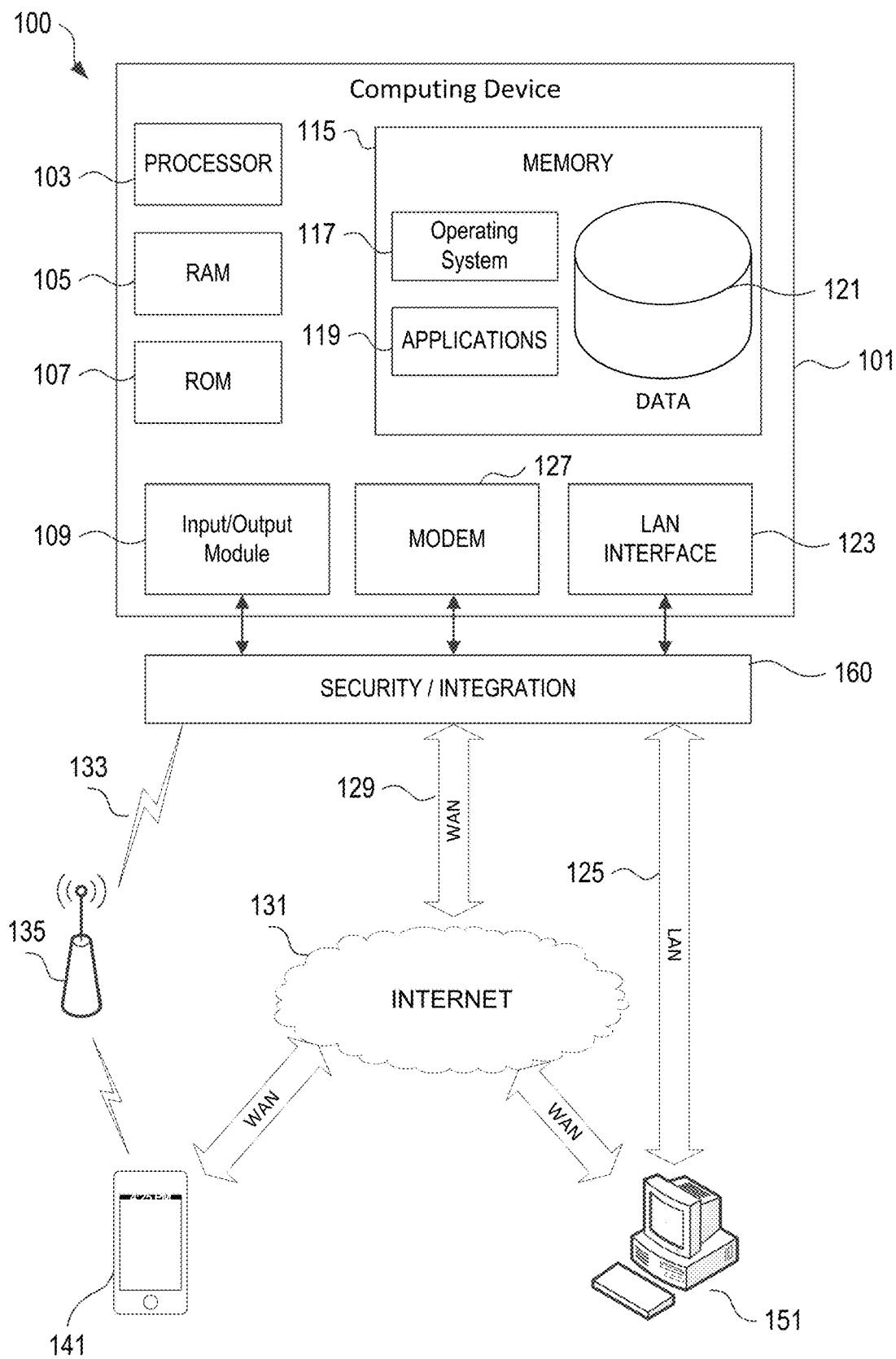
FIGS. 1A and 1B depict illustrative block diagrams of operating environments in accordance with aspects of this disclosure.

It will be apparent to one skilled in the art after review of the entirety disclosed that the steps illustrated in the figures listed above may be performed in other than the recited order, and that one or more steps illustrated in these figures may be optional.

DETAILED DESCRIPTION

Systems and methods in accordance with aspects of this disclosure may be provided to generate and create a map reflecting how people feel about a driving route. Such a map may be generated using information received from a user regarding a driver's feelings and/or emotions (e.g., unease, fear, frustration, anger, relaxation, bored, sleepy, confident, alert, aware, confused, etc.) regarding different road segments along their route. For example, the driver may provide information corresponding to what aspects of the route make that particular driver nervous or afraid. The driver may enter information regarding their feelings towards road conditions (e.g., potholes, standing water, turns, bridges, narrow lanes, darkness, etc.), a time of day, weather conditions (e.g., rain, fog, wind, storms, an angle of sunshine, etc.), environmental hazards (e.g., debris in the road, a threat of debris falling into the roadway, smoke from a nearby fire, etc.), a particular human condition, and/or other people within the vehicle (e.g., a number of people in the vehicle, a noise level within the vehicle, a number of children being present, etc.), traffic flow, one or more traffic patterns, a traffic amount (e.g., heavy traffic), a time of day (e.g., night driving, rush hour, etc.), an event that may have an effect on traffic congestion (e.g., a concert, a sporting event, a political rally, etc.), pedestrian traffic (e.g., e.g., a crosswalk, a school zone, etc.), and the like. In some cases, the information may be gathered in near real-time, at time intervals during a trip, before a trip, after a trip, or the like.

When information is gathered during a trip, either in near-real time, or at time intervals, the information may be collected via one or more input devices that may include a voice-based application or a button easily (and safely) accessible to the driver or other occupant. For example, a driver may speak a key word (e.g., "now") or press a button to indicate a time at which the driver is not at ease. In some cases, the information is entered as a binary entry. For example, the driver is or is not nervous. In other cases, the driver may be able to indicate a level of unease when providing the information. For example, the driver may be prompted at the conclusion of the trip to enter additional information about times that indicate a feeling of unease. In other cases, the user input device may be capable of providing the additional information at the time of entry. For example, the user input device may not only be capable of detecting a time at which the driver indicates the feeling of unease, but also sense a level of unease at the time. For example, a physical button may include a pressure sensor, where a pressure level may be analyzed to determine a level of unease, particularly in comparison with different entries made by the same driver. In some cases, a light pressure may be determined to indicate a low level of disquiet, thus indicating a mild reaction to a subjective risk event experienced on the road. Similarly, higher pressures applied to the button may be determined to indicate greater feelings of unease to the particular subjective risk experienced by the user. In some cases, a computer device may analyze the information to determine, using one or more mathematical algorithms (e.g., a mathematical algorithm customized for each driver, a unique algorithm for a group of drivers, etc.), a level of unease to be associated with each subjective risk experienced along the route. Further, a duration of time associated with how long pressure has been applied to the button and/or a duration of time associated with an amount of applied pressure may be used in determining the level of unease for the particular occupant of the vehicle. In some cases, one or more sensors may be used (e.g., biometric sensors, pressure sensors, microphones, etc.) to generate a signal representative of a driver's feeling of unease, without the driver consciously providing the information. For example, one or more biometric sensors may be used to sense an increase in a heart rate, breathing rate, and/or the like. In other cases, a pressure sensor may be embedded within the steering wheel of the vehicle and configured for sensing a grip pressure. Such examples illustrative and are not to limit the sensor type or location to the enumerated examples.

In some cases, the one or more mathematical algorithms may be personalized based on information corresponding to a particular driver. For example, the mathematical algorithm may include one or more weighting variables that may be adjusted based on a particular driver's profile, driving history, subjective risk scores and/or the like In an illustrative example, an algorithm may utilize a linear relationship between pressure and the determined level of unease for a particular driver on a particular road or type of road in determining a value for the one or more weighting variables.

In some cases, a personalized mathematical algorithm may be generated for each driver or group of drivers (e.g., student drivers, drivers within a specified age range, etc.). For example, an algorithm may include one or more weighting factors that may be adjusted based on characteristics of a particular driver. By using personalized algorithms, the same road segment may have a different subjective risk score based on the personalized weighting factors for each driver. In an illustrative example, an algorithm for scoring a particular road segment may include one or more weighting factors associated with different features that may be encountered on the road. For example, the road segment may include one or more unprotected left turns, where a first driver may be confident in performing such turns, therefore an associated weighting factor may be used to provide a low weight (e.g., 0.1, 0.2, etc.) to this feature. However, a second person (e.g., an inexperienced driver) may have a greater sense of unease when performing an unprotected left turn, so that the weighting factor may cause this road feature to have an increased weight (e.g., 0.6, 0.7, etc.) in the calculation of the subjective risk score. By customizing or personalizing the mathematical algorithm, the resulting subjective risk score will be a more accurate predictor of how risky a particular road segment will be perceived by each driver. For example, the mathematical algorithm customized for the first driver may predict that the first driver will experience low subjective risk (e.g., a subjective risk score of 20, 30, etc.), while the mathematical algorithm customized for the second driver may predict that the second driver will experience a higher subjective risk along the same road segment. (e.g., a subjective risk score of 60, 70, etc.). In some cases, the mathematical algorithm and/or the weighting factors used in the mathematical algorithm may be updated for the particular driver upon entry of new information in near real-time, at a defined interval, upon a driver profile update, when an application is started or stopped and/or the like.

In some cases, the subjective risk map, the subjective risk scores, or a combination may be used to generate educational and/or training routes to assist drivers in improving one or more aspects of their driving. While all drivers may benefit from such training routes, student drivers and/or newly licensed drivers may benefit the most. For example, the subjective risk data may be used to determine routes (e.g., a plurality of route segments) that let the drivers practice types of roads that they are just slightly uncomfortable with so that they can improve and become comfortable on those roads. Each driver may generate a custom route based on a personalized mathematical algorithm and/or subjective risk profile. The driver may then be moved to other types of roads on which they need experience. In such cases, the subjective risk map and/or subjective risk information may be used, not to minimize risk, but rather to generate routes that give a very slight subjective risk, to allow a driver to practice and become more comfortable.

In some cases, when a driver experiences a lack of unease for too long, even in safe driving conditions (e.g., a route segment with a low objective risk score), the driver may become more risky because he/she may lose focus on the road. In such cases, a route may be generated where, rather than reducing subjective risk, a route may be generated where the route segments include a specified level of subjective risk along the entire route. This route may actually be safer because it allows the driver to become more focused, than those driving a route with a minimized level of subjective risk. In some cases, a route may be generated such that the route segments may alternate between periods of some subjective risk (e.g., medium subjective risk, high subjective risk, etc.) and periods of low or no subjective risk. In some cases, such a route may ultimately result in being the safest route. As such, the customizable algorithms may be used to determine that subjective risk may not need to be minimized to maximize safety, and that there may even be a target subjective risk level (e.g., 30% subjective risk, 40% subjective risk, etc.) that maximizes safety for each driver. In some cases, the target subjective risk level may be a set target for all drivers, a group of drivers, or may be customizable for each individual driver.

In some cases, the one or more algorithms may each utilize a different relationship based on an equation or an exponential relationship between the sensed pressure and the determined level of unease. In some cases, a personalized algorithm may utilize one or more thresholds to indicate a level of unease, where a pressure below a threshold may indicate a lesser level of unease and a pressure above the threshold may indicate a higher level of unease. In some cases, other parameters may be used instead of, or in addition to, pressure, such as a time duration during which the button was depressed, where the length of time may be analyzed to determine a level of unease, with or without an associated pressure reading. In cases where the information entry method uses a microphone, the keyword and/or tone of voice may be analyzed using algorithms similar to those discussed above, where a presence of a keyword may indicate that the driver is experiencing unease, and a tone of voice and/or length of time the driver speaks may be used to identify an accompanying level of unease. In many cases, the subjective risk identified for different road segments may be aggregated over a population of drivers (e.g., all drivers, drivers with similar characteristics, etc.) to determine a level of risk associated with the different road segments.

A subjective risk analysis system may receive information via a network from one or more drivers and analyze the subjective risk information to determine a subjective risk score associated with each driver based on a mathematical algorithm. In some cases, the subjective risk information may be used as inputs to the mathematical algorithm and/or used to modify the algorithm itself so that the mathematical algorithm may be customized for each driver. By using such a customizable algorithm, the subjective risk score may be personalized for individual drivers such as by using personalized weighting factors for different road segments, geographical areas, road times, and the like. This subjective risk score may be representative of types and levels of risks that the driver may experience upon a route before experiencing a level of unease. Further, the subjective risk score may be used to represent that at least a portion (e.g., a specified percentage) of a route upon which a particular driver may experience a minimum of subjective risk. The subjective risk score may also be used to represent a pattern of risk across a plurality of route segments of a route, where a transition between a route segment having a low subjective risk and a route segment having a higher subjective risk may be made more gradual to avoid a quick transition between subjective risk levels. In such cases, a route provided to a driver may have a subjective risk score for the complete route may have a higher overall risk than a different route that may include a quick transition between route segments with high subjective risk and low subjective risk. This subjective risk score, along with any identified risks for which the driver has indicated some level of unease, may be used to determine a subjective risk map and/or one or more routes for the driver to follow to minimize an amount of subjective risk experienced by the driver during a trip.

In some cases, the subjective risk score may be combined with one or more other scores related to a risk that may be identified from the route, such as an objective risk score. The resulting combined risk score may be output by the computing device as an "overall" risk score. In some cases, the one or more subjective risk scores may be used to supplement an objective risk score and, vice versa, an objective risk score may be used to supplement a calculated subjective risk score. For example, the subjective risk identified for a route may correspond to one or more road characteristics, such as a case where a person may experience a greater level of unease in a road segment having a blind left-hand turn. An objective risk map having a representation of an objective risk score for a particular road segment may show an indication that a greater number of accidents may occur along the road segment having a blind left-hand turn, however a subjective risk may be reduced for that particular driver as the subjective risk score may predict that the driver may be more alert when approaching that particular road segment.

In some cases, rather than simply minimizing risk, a subjective risk score may be calculated to provide a desired level of subjective risk for a route. In an illustrative example, a subjective risk score may be calculated to generate a route having a subjective risk score corresponding to an "optimal" level of subjective risk such that the driver remains alert, but not particularly uncomfortable. In some cases, this optimal level of risk may be customized for each individual driver. For example, the subjective risk scores determined for a particular driver may be compared to a threshold and/or an average of subjective risk scores of similar drivers (e.g., similar in age, experience, demographics, etc.) for different types of road hazards (e.g., an unprotected left turn, road geometry, landscape features, etc.) and/or conditions (e.g., rain, snow, wind, etc.).

For example, this information may be analyzed using one or more mathematical algorithms to determine a location and/or a likelihood that a subjective risk may exist along a route. The subjective risk analysis system may further incorporate objective risks (e.g., construction areas, wildlife areas, accident prone areas, dangerous intersections, etc.) when generating the subjective risk map and/or routes. Such information may be overlaid on a map and indicate such subjective risks based on a particular driver, or a particular grouping of drivers. Drivers may be grouped by any combination of age, relative driving experience, a driver license type (e.g., passenger, commercial, etc.), a number of passengers within the vehicle, a preference of route types (e.g., a fastest route, a route avoiding major roadways, etc.) and/or the like. In some cases, the drivers may be grouped based on one or more subjective risk scores that may be stored as a portion of a subjective risk profile for each driver. For example, one or more groups of drivers may be formed based on the drivers having similar subjective risk scores across a variety of situations that may be encountered along a route or by having similar risk profiles. Such groupings of drivers may be used to crowd-source the information populating the subjective risk map, where the subjective risks shown on the map may be associated with a particular driver, a particular class of driver, or other such grouping of similar drivers.

In some cases, a business organization, such as an insurance company, may utilize the information gathered on a subjective risk map, an objective risk map and the like to determine where the different maps are aligned or are different. In some cases, the insurance company may analyze the information to determine which drivers may experience a lower level of unease or a higher level of unease as compared to the total population of drivers. In such cases, the business organization may use this information to inform business rules and/or policies. For example, an insurance company may incorporate such information regarding subjective risks and/or objective risks into an overall risk score for a particular driver. In some cases, the overall risk score may be used to identify educational materials or provide tools that may be used in providing training for a driver so that the driver may overcome a fear, or otherwise decrease a feeling of unease.

In some cases, in accordance with aspects of this disclosure, one or more of a personal navigation device, a vehicle, a mobile device, and/or a personal computing device may access a database of risk values associated with a subjective risk map to assist in identifying and presenting alternate low-risk travel routes. The driver may select among the various travel routes presented, taking into account his/her tolerance for risk. In some cases, a particular route may be suggested as being the route with the lowest associated subjective risk. In some cases, the personal navigation device, the computing system of a vehicle, the mobile device and/or the personal computing device may be used to obtain an objective risk score associated with one or more routes and/or alternate routes.

FIG. 1A illustrates a block diagram of a computing device (or system) 101 (e.g., a subjective risk map generator) in a computer system 100 (e.g., a subjective risk mapping system) that may be used according to one or more illustrative embodiments of the disclosure. The computing device 101 may have a processor 103 for controlling overall operation of the computing device 101 and its associated components, including one or more memory units (e.g., RAM 105, ROM 107), an input/output module 109, and a memory 115. The computing device 101, along with one or more additional devices (e.g., terminals 141 and 151, security and integration hardware 160) may correspond to any of multiple systems or devices, such as a subjective risk analysis system and/or an input device configured as described herein for determining a level of subjective risk experienced by a driver for a particular road segment, determining an overall level of risk associated with different road segments, determining a subjective risk tolerance for a driver, or grouping of drivers, generating a subjective risk map identifying road segments having some level of associated subjective risk, and/or generating one or more routes for a driver, or group of drivers based on a desired level of subjective risk exposure. In some cases, the level of subjective risk determined for a route may be combined with a level of objective risk calculated for the route to determine a combined objective/subjective risk score for the route.

The input/output (I/O) 109 may include one or more user interfaces, such as a microphone, a keypad, one or more buttons, one or more switches, a touch screen, a stylus, one or more pressure sensors, one or more biometric sensors, and/or one or more other sensors (e.g., an accelerometer, a gyroscope, etc.) through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the system 101 to execute a series of computer-readable instructions, for example, to determine a subjective risk associated with one or more of a plurality of road segments and/or to determine a user's tolerance for subjective risks experienced while traveling along a route. In some cases, the instructions may be configured to cause the processor 103 to determine one or more routes for a user to travel based, at least in part, on the user's tolerance for subjective risks that may occur along the route. In other cases, the instructions may be configured to cause the processor 103 to determine, using aggregated subjective risk information obtained from a plurality of users, a crowd-sourced subjective risk map, where subjective risks may be overlaid over the map to show areas where drivers experience unease while travelling along a route.

The computing device 101 (e.g., a customer terminal, an insurance provider computer hardware memory and processor system, an insurance clearinghouse computer memory and processor device, etc.) may operate in a networked environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, vehicles, and the like), and may include some or all of the elements described above with respect to the computing device 101. In some cases, the terminals 141, 151 may be located at one or more different geographic locations, including, but not limited to, at a customer location, a site associated with an insurance agent and/or agency and/or a site associated with an insurance provider. The network connections depicted in FIG. 1A include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet, a cellular network, and the like). When used in a wireless telecommunications network 133, the device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless network 133.

Also illustrated in FIG. 1A is a security and integration layer 160, through which communications may be sent and managed between the computing device 101 and the remote devices (141 and 151) and remote networks (125, 129, and 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, security and integration layer 160 may comprise a set of web application servers configured to use secure protocols and to insulate the computing device 101 (e.g., one or more servers, a workstation, etc.) from external devices 141 and 151. In some cases, the security and integration layer 160 may correspond to a set of dedicated hardware and/or software operating at the same physical location and under the control of same entities as the computing device 101. For example, the layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from computing device 101 in may include secure and sensitive data, such as historical vehicle location information, real-time vehicle location and/or status information, insurance customer and policy data, etc. Therefore, it may be desirable to protect the data transmission by using secure network protocols and encryption, and also to protect the integrity of the data stored when on the computing device 101 using the security and integration layer 160 to authenticate users and restrict access to unknown or unauthorized users. In various implementations, security and integration layer 160 may provide, for example, a file-based integration scheme or a service-based integration scheme. In file-based integration, data files may be transmitted to and from the computing device 101 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the system 100 between the computing device 101 and/or security and integration layer 160. The web services may be accessed by authorized external devices and users to support input, extraction, and manipulation of the data in the computing device 101. Web services built to support the system 100 may be cross-domain and/or cross-platform, and may be built for enterprise use. Such web services may be developed in accordance with various web service standards, such as the Web Service Interoperability (WS-I) guidelines. In some examples, system web service may be implemented in the security and integration layer 160 using the Secure Sockets Layer (SSL) or Transport Layer Security (TLS) protocol to provide secure connections between the computing device 101 and various clients 141 and 151 attempting to access, insert and/or manipulate data within the system 100. SSL or TLS may use HTTP or HTTPS to provide authentication and/or confidentiality. In some cases, system web service may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1A, various elements within the memory 115 or other components in the system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, Bluetooth, WiMAX, etc., is presumed, and the various computer devices and insurance clearinghouse system components described herein may be configured to communicate using any of these network protocols or technologies.

Additionally, one or more application programs 119, such as a subjective risk map determination application, may be used by one or more computing devices (e.g., the computing device 101) within the system 100, including computer executable instructions for identifying a subjective risk tolerance for a driver (or owner, passenger, parent of the driver, etc.) of a vehicle, identifying one or more road segments upon which the driver experiences some level of subjective risk, generating a subjective risk score associated with the driver corresponding to a tolerance level towards subjective risks, generating a subjective risk map based on aggregated subjective risk information received from a plurality of drivers, determining a plurality of routes for suggestion to a driver based on the risk tolerance of the driver or group of similar drivers.

Figure 1B:
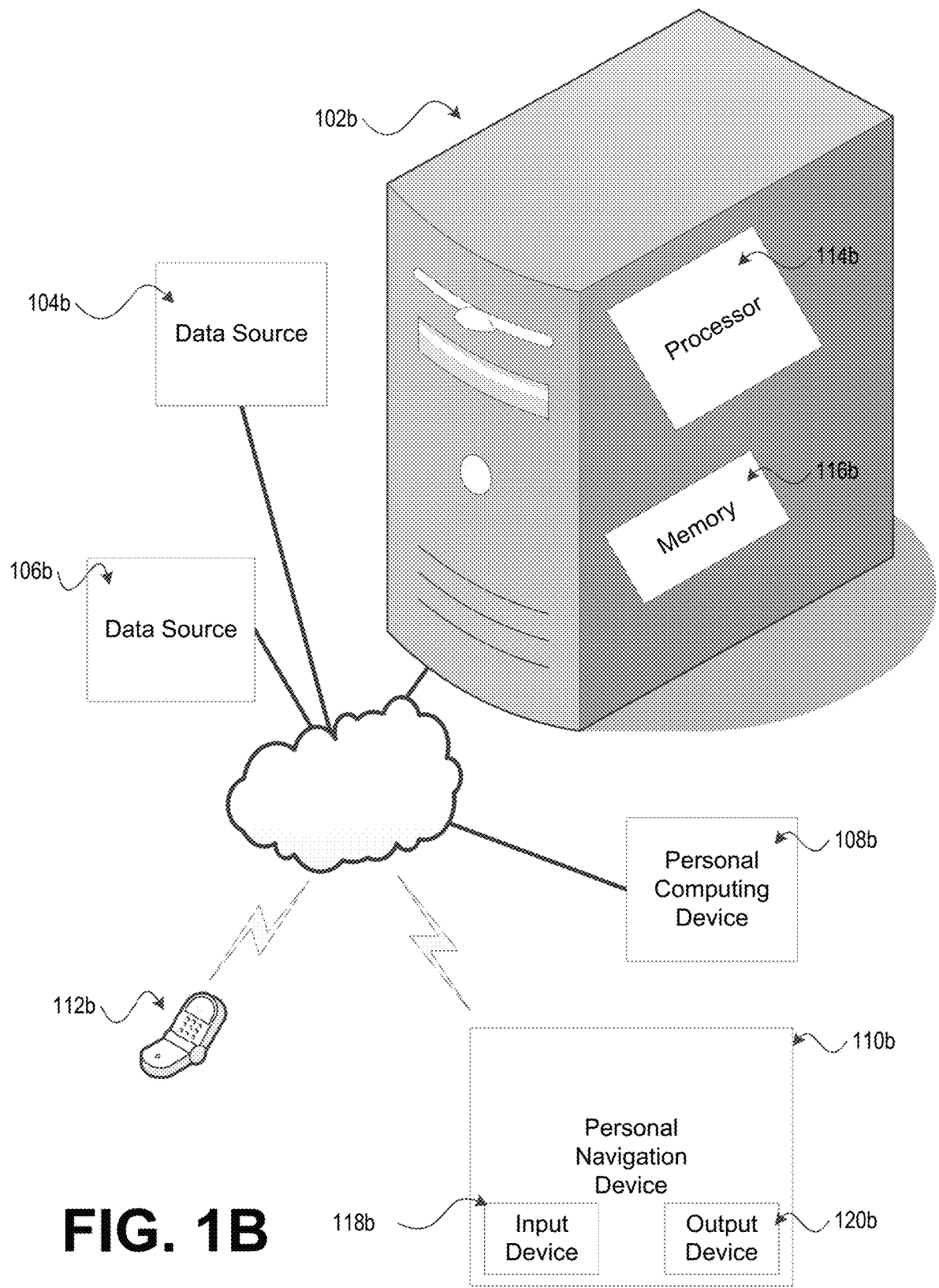

Referring to FIG. 1B, an example of a suitable operating environment in which various aspects of this disclosure may be implemented is shown in the architectural diagram of FIG. 1B. The operating environment is only one example of a suitable operating environment and is not intended to suggest any limitation as to the scope of use or functionality of this disclosure. The operating environment may be comprised of one or more data sources 104b, 106b in communication with a computing device 102b. The computing device 102b may use information communicated from the data sources 104b, 106b to generate values that may be stored in a conventional database format. In one embodiment, the computing device 102b may be a high-end server computer with one or more processors 114b and memory 116b for storing and maintaining the values generated. The memory 116b storing and maintaining the values generated need not be physically located in the computing device 102b. Rather, the memory (e.g., ROM, flash memory, hard drive memory, RAID memory, etc.) may be located in a remote data store (e.g., memory storage area) physically located outside the computing device 102b, but in communication with the computing device 102b.

A personal computing device 108b (e.g., a personal computer, tablet PC, handheld computing device, personal digital assistant, mobile device, etc.) may communicate with the computing device 102b. Similarly, a personal navigation device 110b (e.g., a global positioning system (GPS), geographic information system (GIS), satellite navigation system, mobile device, other location tracking device, etc.) may communicate with the computing device 102b. The communication between the computing device 102b and the other devices 108b, 110b may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102b and other devices (e.g., devices 108b, 110b) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In another embodiment in accordance with aspects of this disclosure, a personal navigation device 110b may operate in a stand-alone manner by locally storing some of the database of values stored in the memory 116b of the computing device 102b. For example, a personal navigation device 110b (e.g., a GPS in an automobile) may be comprised of a processor, memory, and/or input devices 118b and/or output devices 120b (e.g., keypad, display screen, speaker, etc.). The memory may be comprised of a non-volatile memory that stores a database of values used in calculating an estimated route risk for identified routes. Therefore, the personal navigation device 110b need not communicate with a computing device 102b located at, for example, a remote location in order to calculate identified routes. Rather, the personal navigation device 110b may behave in a stand-alone manner and use its processor to calculate route risk values (e.g., subjective risk values and/or objective risk values) of identified routes. If desired, the personal navigation device 110b may be updated with an updated database of values after a period of time (e.g., an annual patch with new risk values determined over the prior year).

In yet another embodiment in accordance with aspects of this disclosure, a personal computing device 108b may operate in a stand-alone manner by locally storing some of the database of values stored in the memory 116b of the computing device 102b. For example, a personal computing device 108b may be comprised of a processor, memory, input device (e.g., keypad, CD-ROM drive, DVD drive, etc.), and output device (e.g., display screen, printer, speaker, etc.). The memory may be comprised of CD-ROM media that stores values used in calculating an estimated route risk for an identified route. Therefore, the personal computing device 108b may use the input device to read the contents of the CD-ROM media in order to calculate a value for the identified route. Rather, the personal computing device 108b may behave in a stand-alone manner and use its processor to calculate a route risk value. If desired, the personal computing device 108b may be provided with an updated database of values (e.g., in the form of updated CD-ROM media) after a period of time. One skilled in the art will appreciate that personal computing device 108b, 110b, 112b need not be personal to a single user; rather, they may be shared among members of a family, company, etc.

The data sources 104b, 106b may provide information to the computing device 102b. In one embodiment in accordance with aspects of this disclosure, a data source may be a computer which contains memory storing data and is configured to provide information to the computing device 102b. Some examples of providers of data sources in accordance with aspects of this disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of this disclosure, access to the information in the data sources 104b, 106b may be restricted to only authorized computing devices 102b and for only permissible purposes. For example, access to the data sources 104b, 106b may be restricted to only those persons/entities that have signed an agreement (e.g., an electronic agreement) acknowledging their responsibilities with regard to the use and security to be accorded this information.

The computing device 102b uses the information from the data sources 104b, 106b to generate values that may be used to calculate an estimated route risk. Some examples of the information that the data sources 104b, 106b may provide to the computing device 102b include, but are not limited to, accident information, geographic information, and other types of information useful in generating a database of values for calculating an estimated route risk. For example, a driver may have knowledge that accidents may be more common along a particular stretch of a roadway or type of road segment and may experience an increased level of unease as they travel, or approach, a particular road segment.

Some examples of accident information include, but are not limited to, loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident.

Accident information associated with vehicle accidents may be stored in a database format and may be compiled per segment. One skilled in the art will understand that the term segment may be interchangeably used to describe a road segment, intersection, round about, bridge, tunnel, ramp, parking lot, railroad crossing, or other feature that a vehicle may encounter along a route.

Time relevancy validation relates to the relevancy of historical accident information associated with a particular location. Time relevancy validation information may be dynamically created by comparing the time frames of accident information to the current date. For example, if a location or route had many collisions prior to five years ago but few since, perhaps a road improvement reduced the risk (such as adding a traffic light). Time relevancy information may be generated remotely and transmitted by a data source 104, 106 to the computing device 102 like other information. Alternatively, time relevancy information may be calculated at the computing device 102 using other information transmitted by a data source 104, 106. In some cases, time relevancy information may be calculated at the computing device without reference to data communicated from the data source 104, 106. For example, the appropriateness of historical information may be related to the time frame into which the information belongs. Examples of time frames may include, but are not limited to, less than 1 year ago, 1 year ago, 2 years ago, 3 years ago, 4 years ago, 5 to 10 years ago, and greater than 10 years ago. In one embodiment, the more recent the historical information, the greater weight is attributed to the information.

Some examples of geographic information include, but are not limited to, location information and attribute information. Examples of attribute information include, but are not limited to, information about characteristics of a corresponding location described by some location information: posted speed limit, construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density, condition of road (e.g., new, worn, severely damaged with sink-holes, severely damaged with erosion, gravel, dirt, paved, etc.), wildlife area, state, county, and/or municipality. Geographic information may also include other attribute information about road segments, intersections, bridges, tunnels, railroad crossings, and other roadway features.

Location information for an intersection may include the latitude and longitude (e.g., geographic coordinates) of the geometric center of the intersection. The location may be described in other embodiments using a closest address to the actual desired location or intersection. The intersection (i.e., location information) may also include information that describes the geographic boundaries, for example, of the intersection which includes all information that is associated within a circular area defined by the coordinates of the center of the intersection and points within a specified radius of the center. In another example of location information, a road segment may be defined by the latitude and longitude of its endpoints and/or an area defined by the road shape and a predetermined offset that forms a polygon. Segments may comprise intersections, bridges, tunnels, rail road crossings or other roadway types and features. Those skilled in the art will recognize that segments can be defined in many ways without departing from the spirit of this disclosed invention.

Some examples of vehicle information include, but are not limited to, information that describes vehicles that are associated with incidents (e.g., vehicle accidents, etc.) at a particular location (e.g., a location corresponding to location information describing a segment, intersection, etc.) Vehicle information may include vehicle make, vehicle model, vehicle year, and age. Vehicle information may also include information collected through one or more in-vehicle devices or systems such as an event data recorder (EDR), onboard diagnostic system, or global positioning satellite (GPS) device; examples of this information include speed at impact, brakes applied, throttle position, direction at impact. As is clear from the preceding examples, vehicle information may also include information about the driver of a vehicle being driven at the time of an incident. Other examples of driver information may include age, gender, marital status, occupation, alcohol level in blood, credit score, distance from home, cell phone usage (i.e., whether the driver was using a cell phone at the time of the incident), number of occupants.

In one embodiment in accordance with aspects of this disclosure, a data source 104*b* may provide the computing device 102*b* with accident information that is used to generate values (e.g., create new values and/or update existing values). The computing device 102*b* may use at least part of the received accident information to calculate a value, associate the value with a road segment (or other location information), and store the value in a database format. One skilled in the art will appreciate, after thorough review of the entirety disclosed herein, that there may be other types of information that may be useful in generating a database of values for use in, among other things, calculating an estimated route risk.

For example, in accordance with aspects of this disclosure, a data source 104*b* may provide the computing device 102*b* with geographic information that is used to generate new roadway feature risk values in a database of risk values and/or update existing risk values; where the roadway feature may comprise intersections, road segments, tunnels, bridges, or railroad crossings. Attributes associated with roadways may also be used in part to generate risk values. The computing device 102*b* may use at least part of the received geographic information to calculate a value, associate the value with a road segment (or other location information), and store the value in a database format. Numerous examples of geographic information were provided above. For example, a computing device 102*b* may receive geographic information corresponding to a road segment comprising accident information and roadway feature information and then calculate a risk value. Therefore, when calculating a risk value, the system may use, in one example, the geographic information and the accident information (if any accident information is provided). In alternative embodiments in accordance with aspects of this disclosure, the computing device may use accident information, geographic information, vehicle information, and/or other information, either alone or in combination, in calculating risk values in a database format.

The values generated by the computing device 102*b* may be associated with a road segment containing the accident location and stored in a data store. Similar to a point of interest (POI) stored in GPS systems, a point of risk (POR) is a road segment or point on a map that has risk information (e.g., subjective risk, objective risk, etc.) associated with it. Points of risk may arise because incidents (e.g., accidents) have occurred at these points before. In accordance with aspects of this disclosure, the road segment may be a predetermined length (e.g., ¼ mile) on a stretch of road. Alternatively, road segments may be points (i.e., where the predetermined length is minimal) on a road. Furthermore, in some embodiments, road segment may include one or more different roads that are no farther than a predetermined radius from a road segment identifier. Such an embodiment may be beneficial in a location, for example, where an unusually large number of streets intersect, and it may be impractical to designate a single road for a road segment.

Figure 2:
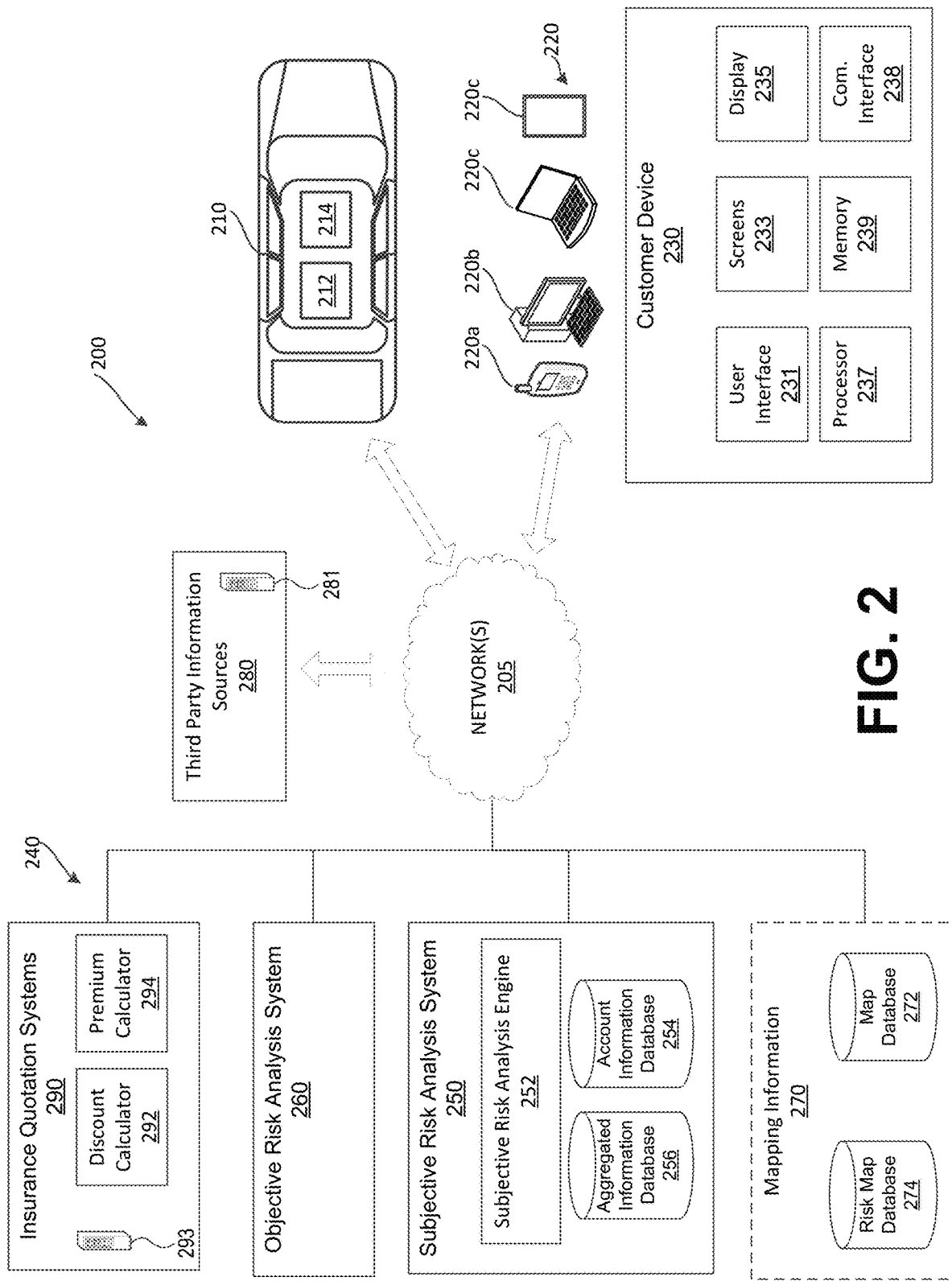
FIG. 2 depicts an illustrative block diagram of a system for generating and using subjective risk information associated with one or more users in accordance with aspects of this disclosure.

FIG. 2 depicts an illustrative block diagram of a system 200 for generating and using subjective risk information, such as by generating one or more subjective risk maps, associated with one or more users in accordance with aspects of this disclosure. The system may include a vehicle 210, one or more user devices 220 associated with a user (e.g., a driver, a passenger, etc.) of the vehicle, and a remote computing system 240 that may be associated with a business entity (e.g., an insurance provider, a vehicle manufacturer, a global positioning company, etc.) or governmental agency having an interest in assessing and/or minimizing a subjective risk associated with one or more segments of road upon which the user travels within the vehicle. The one or more user devices 220 may include a variety of personal computing devices including, but not limited to, a phone (e.g., a smart phone 220*a*), a personal computer 220*b*, a laptop computer 220*c*, a tablet computer 220*d*, a personal navigation device 110*b*, a vehicle's computer system, and/or the like. In some cases, the user devices 220 may comprise the illustrative user device 230 that may include a user interface 231 that may be capable of displaying one or more user interface screens 233 on a display device 235. The user interface screens 233 may include screens for displaying information to the user and/or receiving information from the user. The user device 230 may further include a processor 237, one or more memory devices 239 and a communication interface 238. In some cases, one or more of the user interface 231, the user interface screens 233, the display device 235, the processor 237, the one or more memory devices 239, and/or the communication interface 238 may be implemented similarly to the corresponding features discussed in reference to FIGS. 1A and 1B.

In some cases, one or more devices associated with the user and/or vehicle 210 may communicate via one or more wired or wireless networks 205 to the remote computing system 240. For example, the remote computing system 240 may include one or more of a subjective risk analysis system 250, an objective risk analysis system 260 and/or an insurance quotation system 290. In an illustrative example, the subjective risk analysis system 250 may be configured to generate a subjective risk profile (e.g., a subjective risk class, a subjective risk score, etc.) for one or more users, such as insurance customers of an insurance company. The subjective risk analysis system 250 may utilize demographic information associated with the user, along with subjective risk information solicited or otherwise received from the user when generating the subjective risk profile. In some cases, the subjective risk analysis system 250 may include a subjective risk analysis engine 252 configured to generate subjective risk profiles and/or subjective risk maps associated with customers of the business organization. The subjective risk analysis engine 252 may utilize information received from one or more remote devices associated with the user (e.g., the vehicle 210, the user interface device 212, the input device 214, and the user devices 220, 230) via the one or more networks. In some cases, the subjective risk analysis system 250 may be used to generate and/or store one or more subjective risk maps associated with a group of users (e.g., an age group, a driving experience group, etc.).

In some cases, the objective risk analysis system 260 may be used identify and/or mitigate one or more objective risks associated with a route that may be traveled by the vehicle 210. For example, the objective risk analysis system 260 may be configured to use geographically encoded information to reward and/or promote risk mitigation of identified objective risks (e.g., an accident, a dangerous road segment, etc.) as discussed in co-pending U.S. patent application Ser. No. 14/100,913, filed Dec. 9, 2013, and entitled "Route Risk Mitigation," which is a continuation of U.S. patent application Ser. No. 12/118,021, filed May 9, 2008, issued Dec. 10, 2013 as U.S. Pat. No. 8,606,512, which claims priority to U.S. Provisional Patent Application No. 60/917,169 filed May 10, 2007. All of the aforementioned are incorporated by reference in their entirety herein.

One or more of the objective risk analysis system 260 and/or the subjective risk analysis system 250 may access, via the wired or wireless networks 205, information provided by one or more computer systems 281 associated with a plurality of third-party information sources 280. Illustrative examples of third-party data sources may include the one or more data sources 104b, 106b discussed above. Further, one or more devices within the insurance quotation system 290, the third party information sources 280, the mapping information, the objective risk analysis system 260, and/or the subjective risk analysis system 260 may be implemented using computing devices (e.g., the computing device 101, 102a, etc.) discussed in reference to FIGS. 1A and 1B.

The remote computing system 240 may further include one or more databases for storing mapping information 270. In some cases, the mapping information may include geocoded mapping information stored within a map database 272. The geocoded mapping information may include, but not be limited to the location and mapping information discussed above, such as information about characteristics of a corresponding location (e.g., posted speed limit, construction area indicator, topography type, road type, road feature, number of intersections, whether a roundabout is present, number of railroad crossings, whether a passing zone is present, whether a merge is present, number of lanes, width of road/lanes, population density, condition of road, wildlife area, state, county, and/or municipality). The mapping information 270 may also include other attribute information about road segments, intersections, bridges, tunnels, railroad crossings, and other roadway features. The mapping information 270 may further include the address and/or latitude and longitude of noted geographic features and/or the characteristics of the corresponding location.

In an illustrative example, the vehicle 210 may include a user interface 212 and an input device 214 accessible to an occupant of the vehicle. The user interface 212 may include a display and/or speakers for presenting audio and/or video information to the user. For example, the display may be used to present geographic information (e.g., a map, a route, etc.) and/or vehicle information (e.g., temperature information, vehicle speed, tire pressure, radio information, cabin environmental information, etc.) to the user via one or more user interface screens. In some cases, the user interface 212 may present the geographic information and/or the vehicle information as an audio message presented using speakers installed within the vehicle. In some cases, the user interface 212 may include a personal computing device 108b, such as the personal navigation device 110b, a smart phone 220a, a laptop computer 220c, and/or the tablet computer 220d. The personal navigation device 110b may be located, for example, in the vehicle 210 or in a mobile device (e.g., the smart phone 220a, the tablet computer 220d, etc.) with location tracking capabilities. In some cases, the input device 214 may include one or more means for the driver and/or passenger in the vehicle to provide information about how they feel regarding a plurality of road segments or type of road segment (e.g., subjective risk information). The input device may be configured to provide the subjective risk information in real-time or near real-time to the remote computing system 240 for processing.

In some cases, the driver and/or passenger in the vehicle 210 may provide subjective risk information (e.g., using the user interface 212, the input device 214 and/or the user devices 220) regarding how they feel towards a particular road segment or type of road segment (e.g., a sense of unease, anxiety, fear, etc.) to be processed by the subjective risk analysis engine 252 using one or more algorithms to determine one or both of a subjective risk score associated and/or a subjective risk class associated with the user. For example, a user may experience some sense of unease based on a witnessed accident, or knowledge of a previous accident along the route, or in a known location. In some cases, the way a person drives and/or acts in a particular driving situation may be influenced by the perceived risk (e.g., a subjective risk), along with any objective risk, present during a time the vehicle is on a particular road segment. In some cases, the subjective risk analysis engine 252 may use the subjective risk information, along with the subjective risk score and/or the subjective risk class, to generate a map identifying subjective risks that may be appreciated by the driver. In some cases, the subjective risk analysis engine 252 may use the subjective risk information, along with the subjective risk score and/or the subjective risk class, to generate a route for use by the use in navigating to a desired location. The identified route may identify one or more identified subjective risks and/or objective risks that may be appreciated by the driver and/or may be configured to avoid one or more of the identified subjective risks and/or the objective risks.

The occupant of the vehicle (e.g., the driver, a passenger, etc.) may provide personal preference information corresponding to an exposure to hazards, or other driving situations, that may be experienced while driving the vehicle along a route. For example, the driver may be presented a questionnaire, either on paper, or electronically via one or more of the personal computing devices 220. The questionnaire may be used to identify a level of risk tolerance towards subjective risks experienced while driving. For example, the questionnaire may prompt the user to identify a preferred driving route, such as whether the driver prefers to take the fastest route, one that avoids major roadways, one that avoids traffic backups, one that avoids unprotected left turns, and/or the like. For example, the questionnaire may prompt the user to give a relative weight (e.g., a ranking, etc.) to one or more identified sources of subjective risks to identify a preferred "trade-off" between a delay time (e.g., minutes spent doing additional driving) versus the driver's perceived comfort or perceived safety along the route (e.g., avoiding unprotected left turns, avoiding bridges, avoiding high-traffic roadways, etc.). The answers provided by the driver may be used in generating the subjective risk score for the particular driver according to one or more customizable mathematical algorithms, such as an algorithm based on weightings associated with each of the answer choices.

In some cases, the people may answer questions regarding different driving situations differently than when the driver experiences similar situations while driving a vehicle. In such cases, the information gathered via the questionnaire may be supplemented, or replaced, by subjective risk information gathered while driving the vehicle.

In some cases, the subjective risk analysis engine 252 may analyze the subjective risk information entered or otherwise obtained about a particular driver. Using this subjective risk information, a subjective risk profile may be built for each driver where the subjective risk profile includes personalized subjective risk information that may be used to generate a subjective risk score for one or more road segments or types of road segments. The subjective risk profile may include information to generate weighting factors or other such information to customize a mathematical algorithm for use in generating a personalized subjective risk score associated with each of a plurality of road segments for a particular driver. For example, a total subjective risk ($R_{ST}$) may be customized for the particular road segments comprising the route and/or the individual traveling the route. For example, a subjective risk value may be calculated for a route as a sum of the subjective risk values for the route segments that comprise the total route. For example, the subjective risk value of a route may be calculated using a customizable equation, such as the illustrative equation:

$$R_{ST}=R_{S1}+R_{S2}+\ldots,$$

Further, each route segment may be calculated as a weighted combination of subjective risks that may be encountered as part of the particular route segment and may be customized using weighting factors (e.g., coefficient) customized for each driver. For example, a subjective risk value for a route segment may be calculated using the illustrative equation:

$$R_s=R_1+AR_H+BR_{ULT}+CR_W+\ldots, \text{ where}$$

$R_s$: A total subjective risk score for a route segment, which may be normalized to a defined range of values (e.g., 0=no subjective risk and 100=Maximum subjective risk)

$R_1$: A subjective risk contribution associated with this particular person's general risk based on the subjective inputs received (e.g., from the pressure sensor).

$R_H$: A subjective risk contribution associated with hills within the particular route segment A: A subjective risk coefficient customized for a particular driver related to driving hilly route segments. May be used with related route segments (e.g., mountains, etc.)

$R_{ULT}$: A subjective risk contribution associated with a number of unprotected left turns within a particular route segment.

B: A subjective risk coefficient customized for a particular driver related to exposure to unprotected left turns.

$R_w$: A subjective risk contribution associated with weather-related issues corresponding to the particular road segment.

C: A subjective risk coefficient customized for a particular driver related to driving in different weather conditions, such as rain, snow, wind, clear, etc.

In some cases, the subjective risk analysis engine 252 may use the subjective risk profile with or without information from the objective risk analysis system 260 to generate a subjective risk score for one or more road segments on which the driver has driven. In some cases, the subjective risk analysis engine 252 may analyze the subjective risk profile with or without objective risk information obtained from the objective risk analysis system 260 to predict a subjective risk score for one or more road segments on which the driver has not driven. For example, if a driver's subjective risk profile indicates that the driver may have problems (e.g., feel uneasy) for a particular road segment type (e.g., hilly roads, unprotected left turns, bridges, 5-way intersections, and the like), the subjective risk analysis engine may process information about a new road segment, such as objective risk information, so that the subjective risk analysis engine 252 may predict a subjective risk score that is personalized for each driver, whether or not the driver has traveled on that route segment. Additionally, the subjective risk analysis engine 252 may use the subjective risk profile to predict subjective risk scores for a type of road segment as compared to road segments that are similar, better, or worse than road segments already driven by the driver. For example, a driver may feel uneasy driving in hilly terrain and may have this unease reflected in their personalized subjective risk profile. The subjective risk analysis engine 252 may then process the subjective risk profile to predict a subjective risk score for a route segment for a route to be traveled by the driver. As such, the subjective risk analysis engine 252 may process a mathematical algorithm that has been customized using the information of the subjective risk profile to predict a personalized subjective risk score for a route that the driver has not travelled. Such route segments may be used in generating a route meeting a defined level of subjective risk the driver may be exposed over the whole route.

In some cases, the relationship of the driver to the owner of the car may be factored into the subjective risk calculations. For example, in many cases, drivers who are driving a car belonging to a family member (e.g., parent, relative, child, sibling, etc.), or an employer, may have a lower tolerance to subjective risks for fear of causing damage to the vehicle. In other cases, such as when a driver is driving a rental car, or a work vehicle, some drivers may have more tolerance towards subjective risks than when they are driving their own vehicles. As such, in some cases, the subjective risk analysis system 250 may identify relationships between drivers, groups of drivers, and vehicles to determine when, and if, a driver's subjective risk score may be adjusted. For example, the subjective risk analysis system may prompt a user to identify which vehicle will be driven when asked to generate a route for a trip.

In some cases, a subjective risk map may be generated to include a person's attitude towards parking, or being near a particular geographic location. Such a map may be generated using a combination of subjective risk information gathered from a subjective risk profile and/or from an objective risk data store. Such a map may be used for risk management over a generated route and/or for parking. Information from parking may be obtained by low-level monitoring of a location near parking lots and/or spaces.

Figure 3:
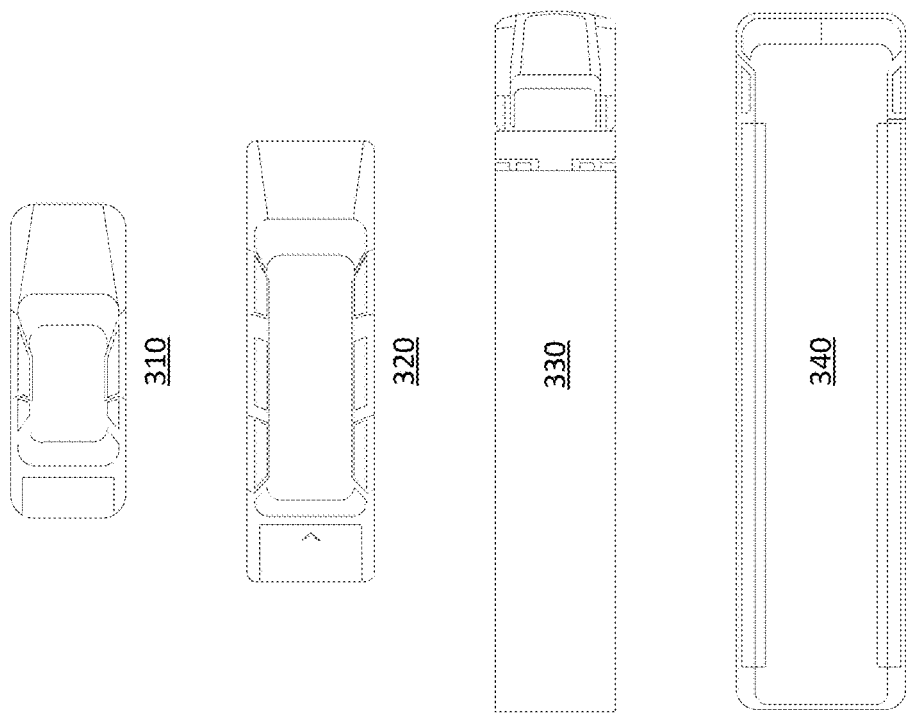
FIG. 3 depicts illustrative block diagrams of vehicle types that may be utilized by a driver in accordance with aspects of this disclosure.

FIG. 3 depicts illustrative block diagrams of vehicle types that may be utilized by a driver in accordance with aspects of this disclosure. For example, the vehicle types may include a personal vehicle type 310, governmental vehicles, and/or one or more commercial vehicle types 320-340, or other vehicle types that may be subject to insurance. The personal vehicle types 310 may include a personal vehicle registered to an individual (or an estate) including, but not limited to a car, a minivan, a van, a truck, a pickup truck, a sports utility vehicle, a recreational vehicle, a motorcycle etc. Illustrative commercial vehicle types may include fleet vehicles 320 such as taxis, limousines, personal vehicles used for business purposes (e.g., a ride sharing business, a delivery service, a courier service, etc.). Other illustrative commercial vehicles may include trucks 330 (e.g., a concrete transport truck, a mobile crane, a dump truck, a garbage truck, a log carrier, a refrigerator truck, a tractor unit, a platform truck, a vehicle transport truck, a flatbed truck, a box truck, a panel van, a tow truck, a canopy express, a pickup truck, a cab-forward truck, a panel truck, a panel van, an ambulance, etc.) and/or buses 340 (e.g., a motor coach, a school bus, etc.). Other vehicles used for commercial purposes may also exist and be applicable to aspects of the disclosure. In some cases, the vehicle types may include other vehicle types that may or may not be included in the above vehicle types, such as certain governmental vehicles (e.g., certain police vehicles, fire trucks, ambulances, military vehicles, etc.), farming equipment (e.g., tractors, combines, harvesters, etc.), recreational vehicles (e.g., boats, off-road vehicles, etc.), and the like.

Figure 4:
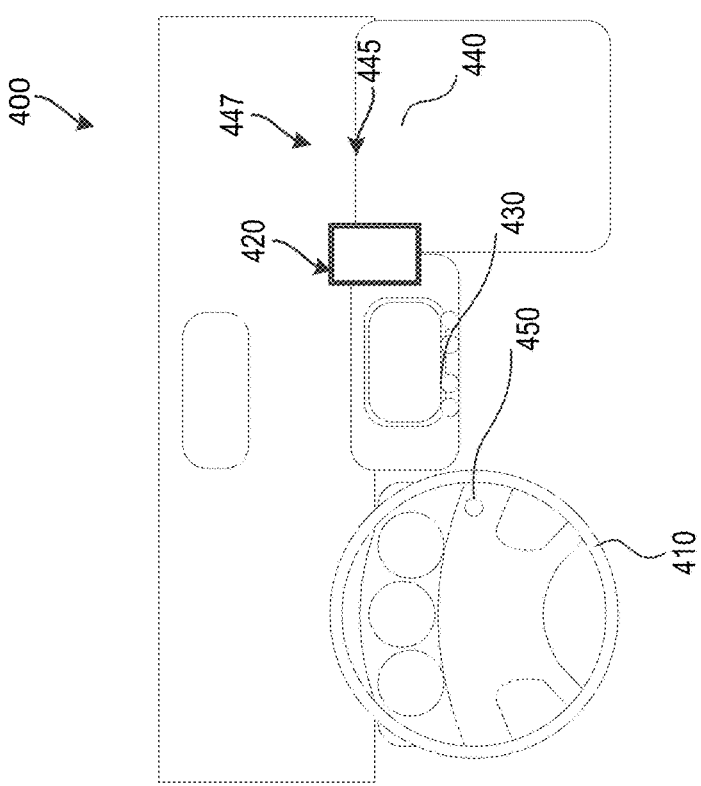
FIG. 4 depicts an illustrative block diagram of an interior space of a vehicle accessible at least to a driver of the vehicle in accordance with aspects of this disclosure.

FIG. 4 depicts an illustrative block diagram of an interior space of a vehicle 400 accessible at least to a driver of the vehicle in accordance with aspects of this disclosure. Within the interior space of the vehicle, the driver, or other occupant, may have access to one or more of a steering wheel 410, a user interface device 420 associated with the vehicle, one or more input devices 430 (e.g., a button, a knob, a touch screen interface, etc.) associated with the user interface device 420, a personal computing device 440 (e.g., the smart phone 220a, tablet 220c, laptop 220c, the personal navigation device 110b, etc.). In some cases, the personal computing device 440 may be placed in a location accessible to the driver. The personal computing device 440 may be physically mounted or otherwise secured to a surface within interior space of the vehicle. In some cases, the personal computing device 440 may not be secured to the interior of the vehicle, but located on a surface or within a cavity provided on an interior surface of the vehicle. For example, the personal computing device 440 may be placed on a table or console, or placed within a cup holder or the like. The personal computing device 440 may include one or more input devices (e.g., a physical button, a button implemented on a touch screen display 445, a microphone 447, or the like. In some cases, an affixed input device 450 may be provided and accessible to a driver or other occupant of the vehicle 210. For example, the input device may comprise a button affixed to the steering wheel or other surface readily (and safely) accessible to the driver while in motion. In other cases, the input device 450 may comprise a microphone capable of receiving an audio input from the user that may be indicative of a subjective risk event. The input device 450 may also comprise one or more sensors capable of producing a signal representative of the driver's comfort level (e.g., level of unease) while driving. Such input devices may include pressure sensors (e.g., near a grip area of the steering wheel 410), heartrate sensors respiration sensors, cameras, and/or the like.

In some cases, the input device 450 may be installed by a vehicle manufacturer and be permanently affixed to a surface of the vehicle interior. In other cases, the input device 450 may be installed as an after-market device. In either case, the input device may be communicatively coupled to a communication device (not shown) that may be configured to communicate the subjective risk information to one of the user device 450, such as by using Bluetooth, or other local wireless or wired communication protocol. In other cases, the input device may be configured to communicate subjective risk information via a cellular network directly to the subjective risk analysis system 250. In some cases, one or more sensors may be used (e.g., biometric sensors, pressure sensors, microphones, etc.) may be used to generate a signal representative of a driver's feeling of unease, without the driver consciously providing the information. For example, one or more biometric sensors may be used to sense an increase in a heart rate, breathing rate, and/or the like. In other cases, a pressure sensor may be embedded within the steering wheel of the vehicle and configured for sensing a grip pressure (e.g., an ongoing pressure). Such examples illustrative and are not to limit the sensor type or location to the enumerated examples.

In an illustrative example, the input device 450 may include one or more biometric sensors capable of sensing biometric information corresponding to the driver. The input device 450 may include a sensor for measuring a rate of a heartbeat, such as by using an infrared sensor. For example, an infrared (e.g., heat) sensor may be used to measure a heartbeat rate through the skin (e.g. of the finger) of the driver. In some cases, a heartbeat, and/or the heartbeat rate (relative to a baseline measured for the driver) may be used to determine when a user is experiencing a subjective risk event as well as the relative level of subjective risk being experienced. For example, the subjective risk analysis computing system may analyze the sensor data and relative heartbeat rate when determining the subjective risk score for each of a plurality of road segments along the route. In an illustrative example, the input device 450 may further comprise a biometric sensor measuring an eye movement, such as by using an imaging device such as a video camera, and/or a heat (infrared) sensor, etc. For example, a video camera may be located within the interior space for the vehicle 400. This video camera may be used to monitor eye activity (e.g., a movement, etc.) to determine whether a driver's eyes are relaxing and/or whether the driver is falling asleep. In another illustrative example, the video camera may capture whether a driver is intensely concentrating or looking rapidly around in many different directions to determine when a user is experiencing a subjective risk event as well as the relative level of subjective risk.

In an illustrative example, one or more pressure sensors may be included in the steering wheel to monitor an on-going pressure on the wheel. For example, a time duration corresponding to a light grip pressure may be correlated to one or more route segments in which the driver has minimal stress. Similarly, a time duration corresponding to a higher grip pressure may be correlated to one or more route segments in which the driver has experienced an elevated level of stress. A short duration of higher pressure may correspond to a location along a route in which a driving event occurred. In such a manner, a driver's stress level may be measured without, or with minimal, input on the driver's part. Similarly, an imaging device, such as a video camera may be positioned so that the driver's eye activity may be monitored to determine whether the driver's eyes are relaxing, if the driver is falling asleep, if the driver is intensely concentrating or looking rapidly around in many different directions. Such eye activity may be correlated to levels of low stress (e.g., relaxing eyes, falling asleep) or levels of elevated stress (e.g., intense concentration, looking rapidly, etc.). The sensors may be used instead of, or in combination, with other methods of measuring a level of driver unease (e.g., stress). For example, one or more thermal sensors or thermal imaging sensors (e.g., an infrared sensor) may be used to monitor a driver's heartbeat, where an increasing heart rate may be correlated to an increasing level of stress. Also, if a driver's temperature is increasing (e.g., heating up) may be correlated to an increasing level of frustration, anger, or other such emotion.

In an illustrative example, the driver of the vehicle may experience one or more instances of unease at particular times and/or places along a route. In doing so, the driver may use the input device 450, 445 to indicate that a subjective risk event has occurred. In doing so, the driver may generate subjective risk information that may be used to determine the driver's tolerance level towards one or more types of subjective risk (e.g., heavy traffic, poor weather conditions, etc.). When triggered, the input device 445, 447 may cause another device, such as the user device 440 to capture and/or store subjective risk information corresponding to the event.

Likewise, the user device 440 may also receive other information to enhance the accuracy of the risk value associated with a travel route. For example, the user device 440 may receive the time of day when the driver is driving (or plans to drive) through a particular travel route. This information may improve the accuracy of the risk value retrieved (in for the travel route. For example, the driver may know, or suspect, that a particular segment of road through a wilderness area may have a higher rate of accidents involving deer during the night hours. As such, the driver may experience unease when driving along that route segment and may utilize the input 447, 450 to indicate this feeling on unease. In some cases, this route segment through the wilderness area may have a higher rate of accidents involving wildlife (e.g., deer, etc.) during the night hours, than during daylight hours. In such cases, the driver may not indicate any feeling of unease when travelling this route segment during the day. However, the driver may still experience stress along that particular stretch of road during the night hours. Therefore, the time of day may also be considered when determining the appropriate subjective risk value. In addition, the user device 440 may receive other information to improve the accuracy of the risk value retrieved for a travel route. Some examples of this other information include, but are not limited to, the vehicle's speed (e.g., a vehicle without a sport suspension attempting to take a dangerous curve at a high speed), vehicle's speed compared to the posted speed limit, etc. In some cases, the user device 440 may include a location device (e.g., a global positioning device, a cellular network positioning system, etc.) to determine a location associated with the perceived feelings of unease by the driver.

In some cases, such as when the user device 450 is a device capable of communication via a cellular network, the subjective risk events may be communicated from the vehicle 210 to the subjective risk analysis system 250 via the cellular network in near real-time. In other cases, the subjective risk event information may be stored within a memory of the user device 440 until the user device 450 is able to communicate the information, such as when the user device is in proximity of a wireless network (e.g., a Wi-Fi network). The memory may be embodied in a non-volatile memory (e.g., in a memory in personal navigation device 110) or portable media (e.g., CD-ROM, DVD-ROM, USB flash, etc. connected to personal computing device 108).

In some cases, the vehicle computing system may be used in addition to, or in place of, one or more other components. In such cases, the vehicle computing system may be used to collect data, analyze data, calculate one or more weighting factors or otherwise customize the mathematical algorithm, and/or generate a subjective risk score for one or more route segments.

Figure 5:
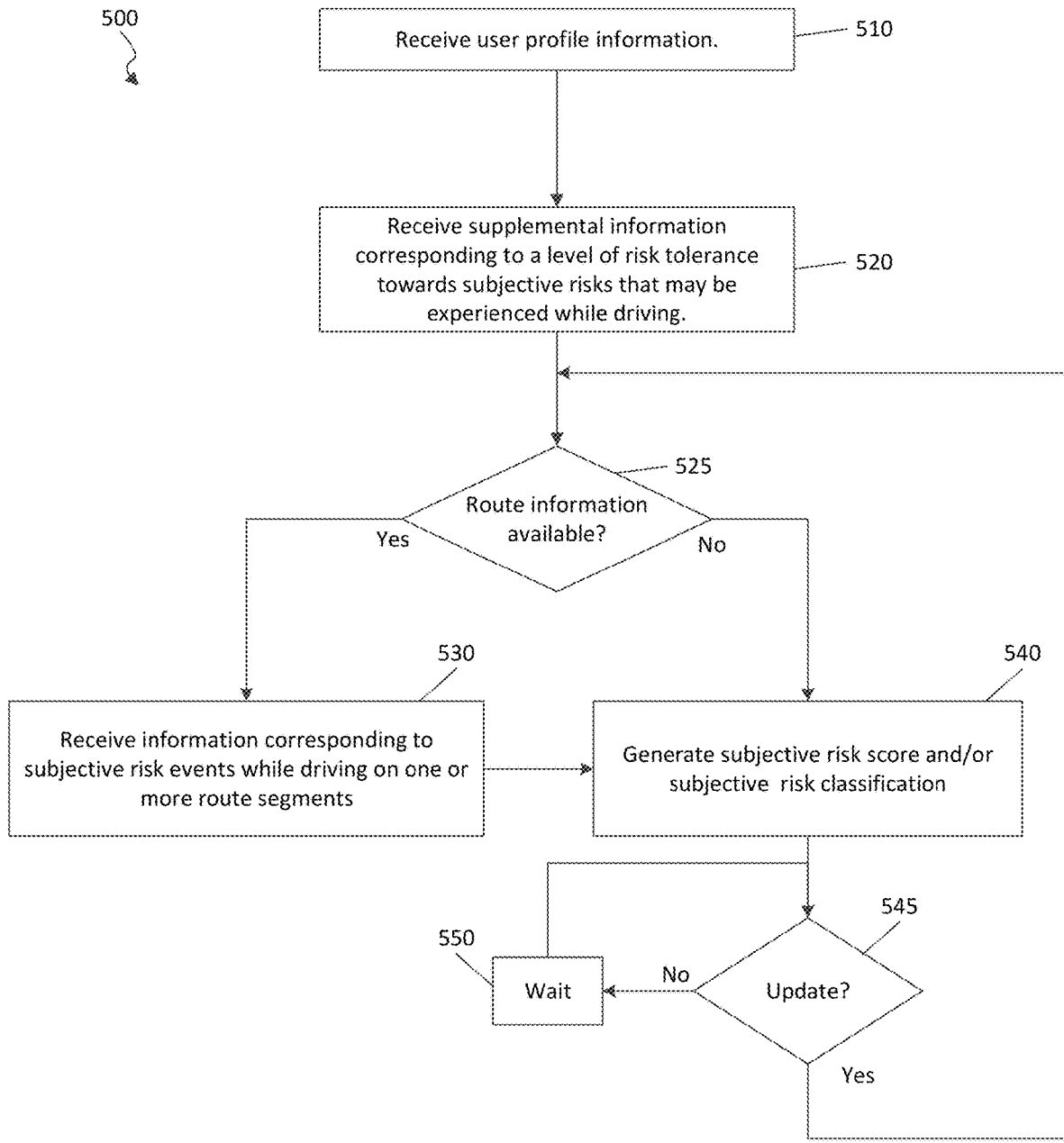
FIG. 5 depicts an illustrative method for determining a subjective risk score associated with a driver of a vehicle in accordance with aspects of this disclosure.

FIG. 5 depicts an illustrative method 500 for determining a subjective risk score associated with a driver of a vehicle 210 in accordance with aspects of this disclosure. At 510, the subjective risk analysis system 250 may receive user profile information about a driver, such as from the account information database 254. The user account information may include user demographic information, car make and model information for the vehicle, driver's license information (e.g., personal driver's license, commercial driver's license, etc.), insurance policy information, a driver experience level, and the like. In some cases, the user account information may include user group information. For example, a user group may correspond to a family group, a work group, a fleet of vehicles, and the like. In an illustrative example, the family group may include information corresponding to a parent, a child and/or others (e.g., a relative, a friend). Similarly, a work group or fleet group information may include a manager, a supervisor, and one or more drivers. The user group information may allow a user with administrative powers with regards to the user group set permissions and/or rules associated with the group. For example, one or both parents may have supervisory powers over other members of the family group (e.g., a child, a friend, a relative, etc.) and may be able to generate rules (e.g., always choose a route minimizing subjective risks, etc.) and/or to specify one or more parameters (e.g., an experience level associated with a child). The manager and/or supervisor users of the commercial or fleet groups may have similar powers, where the manager and/or supervisor users may be capable of setting rules and/or policies corresponding to individual drivers. For example, the managers and/or supervisors may be capable of setting an experience level and/or a subjective risk level for individual drivers within the fleet and/or commercial groups. Such preference information may be stored within the account database 254

At 520, the risk analysis engine 252 of the risk analysis system 250 may receive supplemental subjective risk information corresponding to a level of risk tolerance towards subjective risks that may be experienced while driving the vehicle 210. For example, the subjective risk analysis system 250 may communicate a form and/or a questionnaire to one or more users. The form and/or questionnaires may be communicated to a driver of the vehicle by mail, phone, email and/or the like. By filling out the questionnaire, the user may confirm, modify, or replace one or more parameters stored in the account information database associated with the user. In some cases, the form and/or questionnaire may be presented to the user via the one or more personal computing devices. For example, the user may be presented with a series of questions, such as those listed on a user interface screen of the one or more user devices 220. Once received the subjective risk analysis system may generate an initial subjective risk score for the user based on the user profile information and the received supplemental information.

In some cases, the subjective risk score generated by the subjective risk computing system may be in the form of a number rating the risk tolerance of the driver (e.g., a rating of 1 to 100 where 1 is very low risk tolerance and 100 is very high risk tolerance). Alternatively, the subjective risk score may be in the form of a predetermined category (e.g., low risk tolerance, medium risk tolerance, and high risk tolerance). At least one benefit of displaying the subjective risk score in this form is the simplicity of the resulting display for the driver and/or the ease of user in using the subjective risk score in calculating a route minimizing potential subjective risks that the driver may be subject to during the drive.

At 525, the subjective risk analysis system 250 may check to see whether subjective risk information is available, where the subjective risk information correspond to one or more subjective risks experienced by a driver along a particular route. For example, a user device 220, 440 may send a notification via the communication networks 205 that new subjective risk information is available for analysis. Such notifications may occur at the end of a trip, at periodic time intervals (e.g., about 1 minute, about 5 minutes, about 1 hour, etc.), or in near real-time from when the user experienced the subjective risk event.

If so, at 530, the subjective risk analysis engine 252 may receive the information corresponding to one or more subjective risk events from the user device 220, 440 associated with the driver. The subjective risk analysis engine 252 may then generate a subjective risk score for the user and/or the road segment using information in the user profile and/or the subjective risk information received from the user device 220, 440.

In accordance with aspects of this disclosure, a subjective risk analysis engine 252 may receive the user profile information, the subjective risk information, geographic information, and/or vehicle information. The subjective risk analysis engine 252 may calculate the risk value for the user and/or the road segment (or point of risk) by applying actuarial techniques to the information that may be received from the one or more third party information sources 280. In some cases, the user device 230, when possible, may receive and store subjective risk information in a data store with the latitude/longitude and time of a subjective risk event. The subjective risk event data may be associated with a location and combined with other subjective risk data associated with the same location. Applying actuarial and/or statistical modeling techniques involving multiple predictors, such as generalized linear models and non-linear models, a risk score may be calculated, and the calculated risk value may be recorded in a memory device of the subjective risk analysis engine. The multiple predictors involved in the statistical model used to calculate the risk score may include accident information, geographic information, and vehicle information. Associating the risk value with a line segment and/or point which best pinpoints the area of the road in which the event(s) occurred may be accomplished by using established GIS locating technology (e.g., GPS ascertaining a geographically determinable address, and assigning the data file to a segment's or intersection's formal address determined by the system).

For example, two or more subjective risk events located in an intersection or road segment may have slightly different addresses depending on where within the intersection or segment the subjective risk event location was determined to be. Therefore, the system may identify a location based on business rules. In another example business rules may identify a subjective risk event location using the address of the nearest intersection. In yet another example the system may identify the location of an incident on a highway using segments based on mileage markers or the lengths may be dynamically determined by creating segment lengths based on relatively equal normalized risk values. Therefore, roadways that have stretches with higher numbers of accidents may have shorter segments than stretches that have fewer accidents. In another example, if the incident occurred in a parking lot, the entire parking lot may be associated with a formal address that includes all accidents located within a determined area. One skilled in the art will appreciate after review of the entirety disclosed that road segment includes a segment of road, a point on a road, and other designations of a location (e.g., an entire parking lot). At 540, the subjective risk analysis system 250 may generate the subjective risk score and/or generate a subjective risk classification corresponding to the user and/or the road segment.

Returning to 525, if no subjective risk information is available for one or more route segments associated with the user, the subjective risk analysis engine 252 may generate the subjective risk score and/or a subjective risk classification for the user based on the retrieved account information and the supplemental information provided by the user at step 520.

In some cases, the subjective risk analysis engine 252 may be configured to automatically update the subjective risk and/or the subjective risk classification associated with the user and/or the subjective risk score associated with a particular road segment. For example, the subjective risk scores may be updated periodically and/or updated when new subjective risk information is received by the subjective risk analysis engine.

At 545, the subjective risk analysis engine 252 may monitor a timer and/or the communication interface to determine whether to check if new subjective risk information is available. For example, upon expiration of a periodic timer, the subjective risk analysis engine 252 may query the user device whether new information is available at 525. In other cases, the subjective risk analysis engine 252 may monitor the communication interface for an indication (e.g., a flag) that new subjective risk information has been received. If no update is to be done, the system may wait for a period of time (e.g., an expiration of a timer) or for an event, such as a received message over the communication networks 205.

Figure 6:
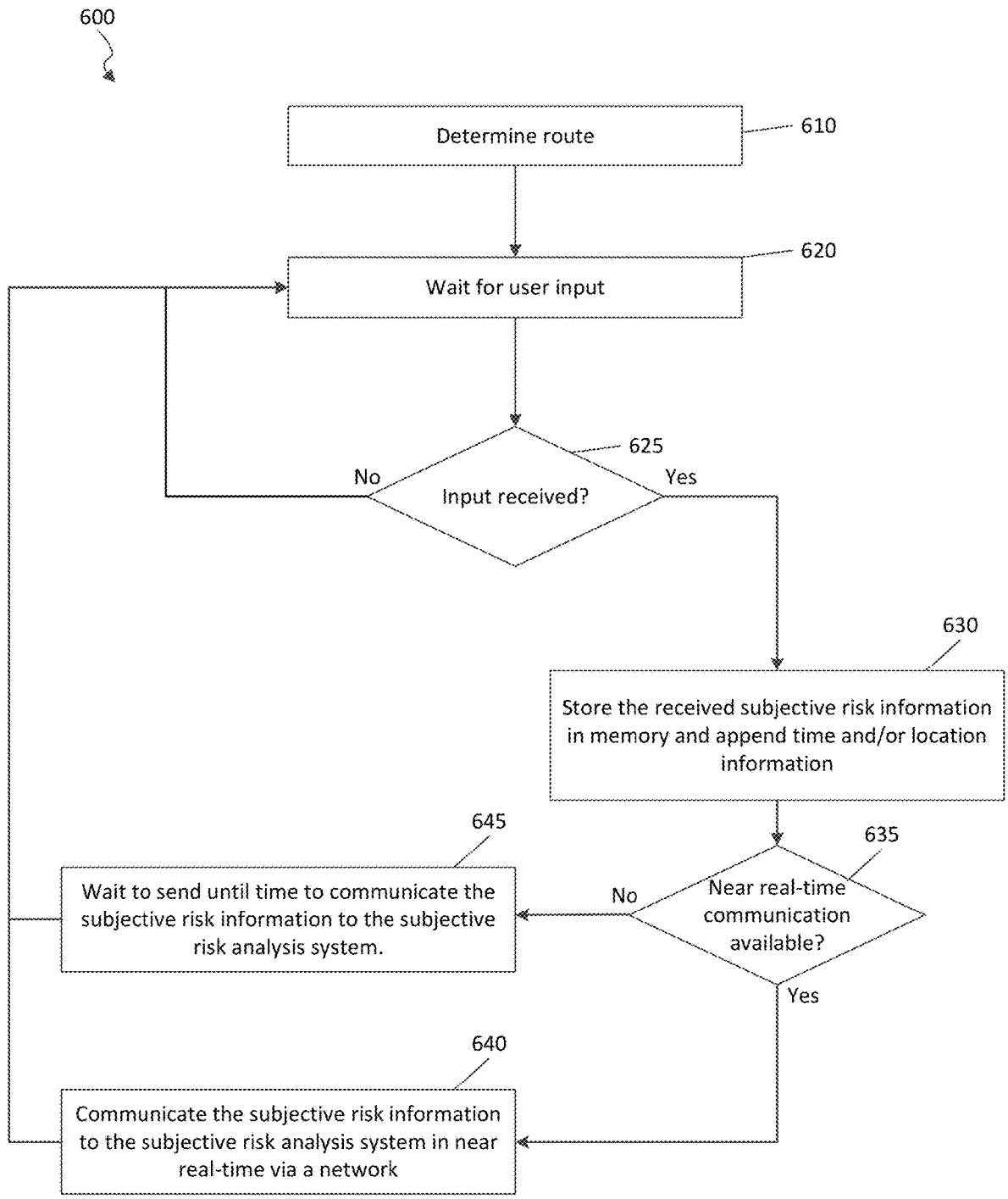
FIG. 6 depicts an illustrative method for processing subjective risk information provided by a user while traveling upon a road segment in accordance with aspects of this disclosure.

FIG. 6 depicts an illustrative method 600 for processing subjective risk information provided by a user while traveling upon a road segment in accordance with aspects of this disclosure. At 610, a user may determine which of several possible routes provided by the subjective risk analysis engine 252 to use while traveling within a vehicle. In some cases, the routes may be stored within a memory on a personal computing device, such as the smart phone 220*a*, and/or the personal navigation device 110*b*. Once selected, the user may proceed along the route. If no input was received at 625, the user device 440 will continue to wait for the user input at 620.

When a user input has been received at 625, the user device 440 may store an indication of the subjective risk event in a memory device, with or without additional information regarding the event. In some cases, the user device may append a time of the subjective risk event and/or a location associated with the subjective risk event triggered by the user via the input device 445, 450 and/or the microphone 457. In some cases, further additional information may be appended, such as geographical information obtained from a positioning system within the user device 440 or in communication with the user device 440. In some cases, the input device 445, 450 and/or the microphone 457 may provide, not only a binary indication of whether a subjective risk even has occurred, but information regarding a severity and/or duration of the subjective risk event. For example, during a subjective risk event, the input device 450 installed in the vehicle may comprise a button. This button may be monitored to determine a period of time during which the button was depressed. This length of time may be indicative of a time duration during which the subjective risk was experienced by a user. For example, the user may experience a period of unease while driving along a road segment in thick fog. In other cases, a severity of the subjective risk event may be determined by using pressure information regarding how hard the driver pressed the input device 450. For example a greater pressure may be indicative of a higher feeling of unease and a lesser pressure may be indicative of a lesser feeling of unease felt by the driver. In some cases, the severity of the event may change over the duration of time associated with the subjective risk event. For example, the user may feel a greater sense of unease at a start of an event than at the conclusion, or vice versa.

At 635, the user device 450 may determine a communication method to be used when communicating the subjective risk information to the subjective risk analysis engine 252 at the remote computing system 240. For example, if near real-time communication is possible (e.g., the user device 440 has access to a cellular communication network), the user device may communicate the subjective risk information when, or close to, the time at which the subjective risk event occurs at 640. If, however, near real time communication is not possible at 635, the user device 440 may be configured to store the subjective risk information locally to the device until such a time that communication via the networks 205 is possible, such as when the user device is able to access a Wi-Fi network. After either communicating the subjective risk information in near real time or storing the subjective risk information locally to the user device 440, the user device 440 may wait for another user input to be received at 620.

In some cases, the subjective risk information may be aggregated over a plurality of users to determine a total subjective risk associated with a plurality of routes indicated upon the subjective risk map overlay. This overlay may be used with an objective risk map to determine a total risk associated with each of one or more route segments indicated on the map. These graded route segments may be used to generate routes for drivers based upon a risk classification. This risk classification may be associated with the particular driver's risk score corresponding to a tolerance to subjective risks that may be encountered. In other cases, the subjective risk tolerance information associated with the users may be used to generate a route based upon groupings of individuals, such as by age (e.g., drivers under age 25, drivers over age 65, drivers between the ages of 25-65, etc.), tolerance to risk, and the like. A total route subjective risk value may be divided by the distance traveled to determine the route subjective risk category for the travel route. For example, a route subjective risk category may be assigned based on a set of route subjective risk value ranges for low, medium, and high risk routes.

After being aggregated, the total subjective risk value may be sent to a viewable display on the personal navigation device 110b or user device 440. Alternatively, the total subjective risk value may be sent to a local/remote memory where it may be recorded and/or monitored. For example, it may be desirable for a safe driver to have her total risk value for all travel routes traveled over a time period to be uploaded to an insurance company's data store to be analyzed or otherwise processed by a computer system at the insurance company, such as the insurance quotation system 290. The insurance company may then identify the driver as a lower-risk driver (e.g., a driver that travels on statistically lower-risk routes during lower-risk times) and provide the driver/vehicle with a discount and/or credit on an existing insurance policy (or towards a future insurance policy). At least one benefit of the aforementioned is that safe drivers are rewarded appropriately, while high-risk drivers are treated accordingly.

In some embodiments in accordance with aspects of this disclosure, the route subjective risk value sent may be in the form of a number rating the subjective risk of the travel route (e.g., a rating of 1 to 100 where 1 is very low subjective risk and 100 is very high subjective risk). Alternatively, the route subjective risk value may be in the form of a predetermined category (e.g., low subjective risk, medium subjective risk, and high subjective risk). At least one benefit of displaying the route subjective risk value in this form is the simplicity of the resulting display for the driver. For example, an enhanced GPS unit may display a route (or segment of a route) in a red color to designate a high subjective risk route, and a route may be displayed in a green color to designate a lower subjective risk route. At least one benefit of a predetermined category for the route subjective risk value is that it may be used as the means for comparing the amount of subjective risk associated with each travel route when providing alternate routes. In addition, the enhanced GPS unit may alert the driver of a high subjective risk road segment and offer the driver an alternate route to avoid that segment.

In some cases, subjective risk values may be used when predicting a likelihood of a driver to experience an accident. For example, the user's subjective risk may be a contributing factor in an accident. For example, a driver may experience a high level of subjective risk when driving in fast moving, but heavy traffic. In such cases, this driver may slow down and an accident may occur with a driver moving faster and not paying attention. Additionally, a driver with a low subjective risk value may be too comfortable in driving during difficult conditions. In such cases, the driver may drive too fast for conditions, thus causing an accident.

When retrieving subjective risk values, in accordance with aspects of this disclosure, one or more techniques, either alone or in combination, may be used for identifying and calculating an appropriate overall risk value for road segments, where the subjective risk values may be used to provide customizable weighting factors for each driver and for use in generating an overall risk value. For example, under an accident cost severity rating (ACSR) approach, each point of an overall risk has a value which measures how severe the average accident is for each point of risk. The value may be normalized and/or scaled by adjusting the range of the values. For example, under an ACSR approach using a range of values from 1 to 10: considering all accidents that occur in a predetermined area (e.g., road segment, state, zip code, municipality, etc.), the accidents in the top ten percentile of expensive accidents in that territory would get a 10 value and the lowest 10 percentile of costly accidents in that region would get a 1 value. The actual loss cost may be calculated by summing the various itemized loss costs (e.g., bodily injury, property damage, medical/personal injury protection, collision, comprehensive, uninsured/underinsured motorist, rental reimbursement, towing, etc.). In some cases, a driver's subjective risk profile may be used to identify modifiers and/or weighting factors for use in determining a contribution for one or more itemized loss costs. For example, a subjective risk score may be used to predict one or more road segments in which a driver may have an increased awareness so that an itemized loss cost (e.g., a collision cost, etc.) may be reduced.

In an alternate embodiment, the ACSR approach may attribute varying weights to the different types of loss costs summed to calculate the actual loss cost. For example, after analyzing the information, certain portions of a loss cost (e.g., medical cost) may indicate risk more accurately than others. The importance of these portions may be weighted more heavily in the final loss cost calculation. Actuarial methods may be used to adjust loss cost data for a segment where a fluke accident may cause the calculated risk value to far exceed the risk value based on all the other data. In some cases, a driver's subjective risk profile may be used to adjust the weights, either up or down based on a predicted subjective risk score for a particular road segment.

Under the accidents per year (APYR) approach, in accordance with aspects of this disclosure, each point of risk has an overall risk value that may reflect the average number of accidents a year for that individual point of overall risk. Under a modified APYR approach, the overall risk value for a point of overall risk continues to reflect the average number of accidents a year, but attributes a lesser weight to accidents that occurred a longer time ago, similar to time relevancy validation (e.g., it gives emphasis to recent accident occurrences over older occurrences). Similarly, the newer subjective risk scores in a subjective risk profile may contribute more to a calculation of the weights used in the APYR approach, than the older subjective risk scores in recognition that driver's perceptions change over time with greater experience.

Under the risk severity (RSR) approach, in accordance with aspects of this disclosure, each point of risk has a risk value that may reflect the severity of objective risk for that individual point of risk. For example, an intersection that is a frequent site of vehicle accident related deaths may warrant a very high risk value under the RSR approach. In one embodiment, risk severity rating may be based on accident frequency at intersections or in segments over a determined period of time. In another embodiment, the rating may be based on loss costs associated to intersections and segments. Yet another embodiment may combine accident frequency and severity to form a rating for a segment or intersection. One skilled in the art can recognize that risk severity ratings may be based on one or a combination of factors associated with intersections or segments. In some cases, the subjective risk score for a driver may be used to adjust the weights used in the RSR approach, based on an understanding that a driver having a subjective risk score within a particular range (e.g., about 30 to about 75, etc.) may be more cautious and/or alert in a particular situation or route segment. A driver having too low a subjective risk score (e.g., less than about 10) may not be alert enough and a driver having too high a subjective risk score (e.g., greater than about 85, etc.) may be too cautious and may not react quickly enough or may overreact to the driving conditions present at the route segment.

Under the Environmental Risk Variable (ERV) approach, in accordance with aspects of this disclosure, each point of risk has a risk value that may reflect any or all information that is not derived from recorded accidents and/or claims, but that may be the (direct or indirect) cause of an accident. In one embodiment, the risk value under the ERV approach may be derived from vehicle information transmitted by a data source 104, 106. In an alternate embodiment, the EVR approach may use compound variables based on the presence or absence of multiple subjective risk considerations which are known to frequently, or severely, cause accidents. A compound variable is one that accounts for the interactions of multiple risk considerations, whether environmental or derived from recorded accidents and/or claims. For example, driving through a wildlife crossing zone at dusk would generate a greater subjective risk value and/or objective risk value than driving through this same area at noon. The interaction of time of day and geographic area and/or geographic type would be the compound variable. Another example may consider current weather conditions, time of day, day of the year, and topography of the road. A compound variable may be the type of infrequent situation which warrants presenting a verbal warning to a driver (e.g., using a speaker system in a personal navigation device 110 mounted in a vehicle) of a high objective risk route (e.g., a high objective risk road segments).

Another possible approach may be to calculate the route subjective risk value using one or more of the approaches described above divided by the length of the route traveled. This may provide an average route subjective risk value for use in conjunction with a mileage rating plan. In one embodiment, the system combines route subjective risk and conventional mileage data to calculate risk per mile rating.

In one embodiment, a device in a vehicle (e.g., personal navigation device 110, mobile device 112, etc.) may record and locally store the route and/or the route and time during which a route was traveled. This travel route information may be uploaded via wireless/wired means (e.g., cell phones, manually using a computer port, etc.). This travel route information may be used to automatically query a data source 104, 106 for route rating information and calculate a total risk value.

The subjective risk types described above may be variables in a multivariate model of insurance losses, frequencies, severities, and/or pure premiums. Interactions of the variables would also be considered. The coefficient the model produces for each variable (along with the coefficient for any interaction terms) would be the value to apply to each subjective risk type. The user device 440 and/or the personal navigation device 110 may initially provide the quickest/shortest route from a start location A to an end location B, and then determine the route subjective risk value by determining either the sum product of the number of each subjective risk type and the value for that subjective risk type or the overall product of the number of each subjective risk type and the value for that subjective risk type. (Traffic and weather conditions could either be included or excluded from the determination of the route subjective risk value for comparison of routes. If not included, an adjustment may be made to the route risk value once the route has been traveled). The driver may be presented with an alternate route which is less risky than the initial route calculated. The user device 440 and/or the personal navigation device 110b may display the difference in subjective risk between the alternate routes and permit the driver to select the preferred route. In some embodiments in accordance with this disclosure, a driver/vehicle may be provided a monetary benefit (e.g., a credit towards a future insurance policy) for selecting a route having less subjective risk.

In another embodiment: the insurance policy is sold and priced in part based on where a customer falls within a three sigma distribution of risk units consumed by all insured per a typical policy period. The policy pricing may be based on an initial assumption of risk to be consumed in the prospective policy period or may be based on subjective risk consumed in a preceding policy period. In a case where the number of risk units consumed is greater than estimated, the customer may be billed for the overage at the end of (or during) the policy period. In yet another embodiment, the system may be provided as a pay-as-you-drive coverage where the customer is charged in part based on the actual risk units consumed in the billing cycle. The system may include a telematics device that monitors, records, and periodically transmits the consumption of risk units to processor 114 that may automatically bill or deduct the cost from an account.

While this disclosure has been described with respect to specific examples including presently exemplary modes of carrying out this disclosure, those skilled in the art will appreciate that there are numerous variations and permutations of the above-described systems and techniques that fall within the spirit and scope of this disclosure.

What is claimed is:
1. A route analysis computer system, comprising:
at least one processor; and
memory storing instructions that, when executed by the at least one processor, cause the route analysis computer system to:
receive, from a computing device associated with a driver travelling within a vehicle in near real-time, a biometric signal that includes sensor data produced by a biometric sensor and is representative of a level of unease or alertness being experienced by the driver during a subjective risk event on a road segment;
determine, based on the biometric signal, a level of subjective risk for the road segment;

analyze the level of subjective risk to determine a subjective risk score for the road segment;

adjust the subjective risk score using one or more weighting variables, the one or more weighting variables adjusted based on information corresponding to the driver, to produce an adjusted subjective risk score for the road segment, the information including at least one of a driver profile or driving history, the driver profile generated using subjective risk information corresponding to the level of unease or alertness regarding the road segment;

update a risk value based on the adjusted subjective risk score for the road segment;

send an alert to the computing device based on the adjusted subjective risk score for the road segment exceeding a threshold;

generate, based on the risk value, a route comprising one or more road segments having a predetermined level of subjective risk along the route;

display, via a vehicle display device, indication of levels of subjective risk of the one or more road segments of the route; and overlay, on a digital map, the indication of the levels of subjective risk of the one or more road segments of the route over geographic information associated with the one or more road segments of the route.

2. The route analysis computer system of claim 1, wherein the one or more road segments of the route alternate between periods of a higher level of subjective risk and periods of a lower level of subjective risk.

3. The route analysis computer system of claim 1, wherein the route is associated with a level of subjective risk that is higher than a minimized level of subjective risk.

4. The route analysis computer system of claim 1, wherein the biometric sensor comprises one or more a blood pressure sensor or a heartrate sensor.

5. The route analysis computer system of claim 1, wherein the biometric sensor comprises one or more a video camera or an infrared sensor.

6. The route analysis computer system of claim 1, wherein the indication comprises one or more of a first color associated with a high level of subjective risk or a second color associated with a low level of subjective risk.

7. A method, comprising:
receiving, by a route analysis computer system and from a computing device associated with a driver travelling within a vehicle in near real-time, a biometric signal that includes sensor data produced by a biometric sensor and is representative of a level of unease or alertness being experienced by the driver during a subjective risk event on a road segment;

determining, based on the biometric signal, a level of subjective risk for the road segment;

analyzing the level of subjective risk to determine a subjective risk score for the road segment;

adjusting the subjective risk score using one or more weighting variables, the one or more weighting variables adjusted based on information corresponding to the driver to produce an adjusted subjective risk score for the road segment, the information including at least one of a driver profile or driving history, the driver profile generated using subjective risk information corresponding to the level of unease or alertness regarding the road segment;

updating a risk value based on the adjusted subjective risk score for the road segment;

sending an alert to the computing device based on the adjusted subjective risk score for the road segment exceeding a threshold;

generating, based on the risk value, a route comprising one or more road segments having a predetermined level of subjective risk along the route;

displaying, via a vehicle display device, indication of levels of subjective risk of the one or more road segments of the route; and overlaying, on a digital map, the indication of the levels of subjective risk of the one or more road segments of the route over geographic information associated with the one or more road segments of the route.

8. The method of claim 7, wherein the one or more road segments of the route alternate between periods of a higher level of subjective risk and periods of a lower level of subjective risk.

9. The method of claim 7, wherein the route is associated with a level of subjective risk that is higher than a minimized level of subjective risk.

10. The method of claim 7, wherein the biometric sensor comprises one or more a blood pressure sensor or a heartrate sensor.

11. The method of claim 7, wherein the biometric sensor comprises one or more a video camera or an infrared sensor.

12. The method of claim 7, wherein the indication comprises one or more of a first color associated with a high level of subjective risk or a second color associated with a low level of subjective risk.

13. One or more non-transitory computer-readable media storing instructions that, when executed by a route analysis computer system comprising at least one processor and memory, cause the route analysis computer system to:

receive, from a computing device associated with a driver travelling within a vehicle in near real-time, a biometric signal that includes sensor data produced by a biometric sensor and is representative of a level of unease or alertness being experienced by the driver during a subjective risk event on a road segment;

determine, based on the biometric signal, a level of subjective risk for the road segment;

analyze the level of subjective risk to determine a subjective risk score for the road segment;

adjust the subjective risk score using one or more weighting variables, the one or more weighting variables adjusted based on information corresponding to the driver to produce an adjusted subjective risk score for the road segment, the information including at least one of a driver profile or driving history, the driver profile generated using subjective risk information corresponding to the level of unease or alertness regarding the road segment;

update a risk value based on the adjusted subjective risk score for the road segment;

send an alert to the computing device based on the adjusted subjective risk score for the road segment exceeding a threshold;

generate, based on the risk value, a route comprising one or more road segments having a predetermined level of subjective risk along the route;

display, via a vehicle display device, indication of levels of subjective risk of the one or more road segments of the route; and overlay, on a digital map, the indication of the levels of subjective risk of the one or more road segments of the route over geographic information associated with the one or more road segments of the route.

14. The one or more non-transitory computer-readable media of claim 13, wherein the one or more road segments of the route alternate between periods of a higher level of subjective risk and periods of a lower level of subjective risk.

15. The one or more non-transitory computer-readable media of claim 13, wherein the route is associated with a level of subjective risk that is higher than a minimized level of subjective risk.

16. The one or more non-transitory computer-readable media of claim 13, wherein the biometric sensor comprises one or more a blood pressure sensor or a heartrate sensor.

17. The one or more non-transitory computer-readable media of claim 13, wherein the biometric sensor comprises one or more a video camera or an infrared sensor.

* * * * *